United States Patent
Cruz et al.

(10) Patent No.: US 11,005,283 B2
(45) Date of Patent: May 11, 2021

(54) BATTERY CHARGER AND METHOD OF CHARGING A BATTERY

(71) Applicant: Black & Decker Inc., New Britain, CT (US)

(72) Inventors: Michael Cruz, Pasadena, MD (US); Geoffrey S. Howard, Columbia, MD (US); Marc W. Mckinley, York, PA (US); Andrew E. Seman, Jr., Pylesville, MD (US); Daniel J. White, Baltimore, MD (US); Brian K. Wohltmann, Shrewsbury, PA (US)

(73) Assignee: Black & Decker Inc., New Britain, CT (US)

( * ) Notice: Subject to any disclaimer, the term of this patent is extended or adjusted under 35 U.S.C. 154(b) by 49 days.

(21) Appl. No.: 14/995,311

(22) Filed: Jan. 14, 2016

(65) Prior Publication Data

US 2016/0204626 A1     Jul. 14, 2016

Related U.S. Application Data

(60) Provisional application No. 62/103,360, filed on Jan. 14, 2015.

(51) Int. Cl.
| | | |
|---|---|---|
| *H01M 10/44* | (2006.01) | |
| *H02J 7/00* | (2006.01) | |
| *H02J 7/04* | (2006.01) | |

(52) U.S. Cl.
CPC ............... *H02J 7/007* (2013.01); *H02J 7/00* (2013.01); *H02J 7/0088* (2013.01); *H02J 7/00711* (2020.01); *H02J 7/007192* (2020.01); *H02J 7/045* (2013.01)

(58) Field of Classification Search
CPC .......................... H02J 7/007; H02J 7/007188
USPC ......................... 320/152, 116, 125, 150, 155
See application file for complete search history.

(56) References Cited

U.S. PATENT DOCUMENTS

| | | | |
|---|---|---|---|
| 3,911,350 A * | 10/1975 | Swope ................. | H02J 7/0091 320/126 |
| 4,297,630 A | 10/1981 | Mullersman et al. | |
| 5,029,266 A | 7/1991 | Randolph et al. | |
| 5,592,070 A * | 1/1997 | Mino .................. | H01M 10/443 320/150 |
| 5,803,215 A | 9/1998 | Henze | |
| 5,844,399 A | 12/1998 | Stuart et al. | |
| 7,061,209 B2 * | 6/2006 | Mori .................... | H02J 7/0091 320/150 |
| 7,598,710 B2 | 10/2009 | Zhang et al. | |

(Continued)

OTHER PUBLICATIONS

EP Search Report dated May 17, 2016.
EP Search Report dated Oct. 30, 2017 issued in corresponding EP application No. 17178991.0.

*Primary Examiner* — Edward Tso
(74) *Attorney, Agent, or Firm* — Michael Aronoff

(57) ABSTRACT

The present invention is directed to a battery charger for charging a battery pack. The battery charger includes a plurality of components including a power supply. The battery charger also includes a temperature sensor that senses the temperature of at least one of the plurality of battery charger components, for example a transformer. The battery charger power supply is adjusted based on the temperature of the at least one of the plurality of battery charger components.

8 Claims, 21 Drawing Sheets

(56) References Cited

U.S. PATENT DOCUMENTS

| | | | |
|---|---|---|---|
| 7,675,265 B2* | 3/2010 | Mori | H02J 7/0091 320/110 |
| 7,733,064 B2 | 6/2010 | Lopata et al. | |
| 7,737,665 B2 | 6/2010 | Grewe et al. | |
| 8,035,351 B2* | 10/2011 | Tsuji | H02J 7/047 320/125 |
| 8,450,982 B2 | 5/2013 | Matsuda et al. | |
| 9,325,191 B2* | 4/2016 | Sakai | H02J 7/022 |
| 9,365,123 B2* | 6/2016 | Flack | B60L 53/62 |
| 2004/0135553 A1 | 7/2004 | Sakakibara | |
| 2008/0030172 A1 | 2/2008 | Darzy | |
| 2010/0026246 A1* | 2/2010 | Yamaguchi | H02H 5/04 320/152 |
| 2010/0085021 A1 | 4/2010 | Cruise et al. | |
| 2012/0274280 A1* | 11/2012 | Yip | H02J 7/0014 320/112 |
| 2013/0002200 A1 | 1/2013 | Kobayashi et al. | |
| 2014/0042983 A1* | 2/2014 | Yamaguchi | H01M 10/46 320/137 |
| 2014/0084851 A1 | 3/2014 | Park et al. | |
| 2014/0111162 A1 | 4/2014 | Osswald et al. | |

* cited by examiner

BATTERY CHARGER AND METHOD OF CHARGING A BATTERY

CROSS-REFERENCE TO RELATED APPLICATION

This application claims the benefit of U.S. Provisional Application Ser. No. 62/103,360 filed Jan. 14, 2015, titled "Battery Charger and Method of Charging a Battery," which is incorporated herein by reference in its entirety.

TECHNICAL FIELD

This application relates to a system and method for charging a battery, particularly a battery pack for a power tool. In one implementation, the system includes a charger that adjusts its output power/current based on charger component temperature.

BACKGROUND

Lithium ion batteries have an associated impedance and more specifically a resistance to their construction. This impedance results in an increase in the voltage of the cell past the state of charge (SOC) voltage during a time of charging. The voltage increase is directly related to the resistance of the cell and the rate of current being applied to the cell. While charging, this voltage increase may cause the cell to exceed a high voltage threshold and the battery charger to terminate charge before the cell reaches it full charge. When the charging current is stopped the cell voltage will fall to its true SOC voltage which is lower than the desired charge voltage. The result is a cell that is not fully charged.

FIG. 1 illustrates a conventional battery charger 100 and battery pack 102. When the battery pack 102 is to be charged, the battery pack 102 is electromechanically coupled to the battery charger 100. The "+" power terminal 104a of the battery pack 102 is coupled to the "+" power terminal 106a of the battery charger 100 and the "−" power terminal 104b of the battery pack 102 is coupled to the "−" power terminal 106b of the battery charger 100. In addition, a plurality of battery pack taps 108a, 108b, 108c, 108d—connections to a node between adjacent battery cells 110—are coupled to a corresponding plurality of battery pack signal terminals 112. When the battery pack 102 is coupled to the battery charger 100 the plurality of battery pack signal terminals 112 are coupled to a corresponding plurality of charger signal terminals 114. The plurality of charger signal terminals 114 are coupled to a cell voltage monitor 116 of the battery charger 100.

The battery charger 100 also comprises a charge controller 118 and a power supply 120. The charge controller 118 connects and disconnects the power supply 120 from the battery pack 102, effectively enabling and disabling charging of the battery pack 102. The power supply 120 receives input power from an external power source. The external power source may be, for example, an AC mains line. The power supply 120 conditions the received AC power and generates a power supply power signal. The power supply 120 is coupled to the charge controller 118 and provides the power supply power signal to the charge controller 118. The power supply 120 may condition the received power by rectifying the AC power signal into a rectified AC power signal. The power supply 120 may also condition the received power signal or the rectified AC power signal by adjusting the current signal provided to the charge controller 118 and the battery pack 102. The charge controller 118 may include a switch that may be placed in a closed state to transfer power to the battery pack 102 or in an open state to prevent the transfer of power to the battery pack 102. The battery charger 100 may also include a current controller 122. The current controller 122 is coupled to the power supply 120. In the conventional battery charger 100 the cell voltage monitor 116 is also coupled to the current controller 122. The current controller 122 may receive control signals from the cell voltage monitor 116 and provide control signals to the power supply 120.

The cell voltage monitor 116 is coupled to the battery charger signal terminals 114 and as such, receives information regarding the voltage levels of the battery cells 110. Based on the information the cell voltage monitor 116 receives from the battery pack 102 the cell voltage monitor 116 generates and sends control signals to the charge controller 118 and/or the current controller 122. The battery pack 102 may also include a temperature sensor 124. The battery pack temperature sensor 124 is positioned near the battery cells 110 and is coupled to a battery pack signal terminal 112a. This signal terminal 112a is coupled to a corresponding battery charger signal terminal 114a which is in turn coupled to the charge controller 118 and/or the current controller 122. Based on the signals received from the battery cell taps 108 and/or the battery temperature sensor 124, the current controller 122 and/or the charge controller 118 can control the charging power/current supplied from the battery charger 100 to the battery pack 102, as will be described in more detail below.

SUMMARY

A first aspect of the present invention includes a battery charger including a temperature sensor that monitors a temperature of one or more components of a power supply of the battery charger and controls an output power of the power supply based solely on the temperature of the one or more power supply components.

Another aspect of the present invention includes a battery charger including a counter. The counter counts each time one or more of a plurality of battery cells in a battery pack coupled to the battery charger exceeds a high voltage threshold. A charging current of the battery charger is controlled by the counter. When the counter count reaches a predetermined count the battery charger will end the charging process of the battery pack.

In addition, each time one or more of the plurality of battery cells in the battery pack exceeds the high voltage threshold the counter instructs the battery charger to temporarily stop charging the battery pack. Alternatively, each time one or more of the plurality of battery cells in the battery pack exceeds the high voltage threshold the counter instructs the battery charger to reduce the charging current supplied to the battery pack.

Another aspect of the present invention includes a battery charger including a timer. The timer monitors a duration of time between one or more of a plurality of battery cells in a battery pack coupled to the battery charger exceeding a high voltage threshold and falling below the high voltage threshold. When the monitored duration of time reaches a predetermined duration the battery charger will end the charging process of the battery pack.

In addition, each time one or more of the plurality of battery cells in the battery pack exceeds the high voltage threshold the timer instructs the battery charger to temporarily stop charging the battery pack. Alternatively, each time one or more of the plurality of battery cells in the battery pack exceeds the high voltage threshold the timer instructs the battery charger to reduce the charging current supplied to the battery pack.

Implementations of this aspect may include one or more of the following features.

Advantages may include one or more of the following.

These and other advantages and features will be apparent from the description and the drawings.

DETAILED DESCRIPTION

A solution that allows the battery cell(s) of a lithium-ion battery pack to be more fully charged is to monitor a temperature of components of the battery charger power supply and to base current control signals to the power supply on the temperature of the battery charger components, such as the power supply, instead of the temperature of the battery cells, as is the case with conventional battery chargers. During the charging process of the battery pack 102, the temperature of battery charger components increases. For example, the temperature increase of the power supply 120' and its components is directly proportional to the voltage level of the battery cell 110 during the charging process. As such, instead of monitoring the voltage level of the battery cell(s) 110, which is costly and inefficient, the presently disclosed battery charger 100' reduces the charging current to the battery pack 102 when the monitored battery charger component reaches a temperature threshold ($T_{TH}$). This process allows the cell(s) 110 to accept more charging current before reaching a final termination voltage level.

As described in more detail below, the instant battery charger 100' monitors the temperature of the power supply transformer. When the transformer temperature is below a temperature threshold, for example 100° C., the battery charger 100' will provide a high level charging current of 1.5X Amps and when the transformer temperature exceeds the temperature threshold the battery charger 100' will provide a low level charging current of X Amps. For example, the high level charging current could be 3 Amps and the low level charging current could be 2 Amps.

An exemplary embodiment of a temperature monitoring circuit (referred to as Boost Mode Circuit in this disclosure) comprises a zener diode clamped power supply, a comparator comprising two bi-polar junction transistors (BJTs), a negative temperature coefficient (NTC) thermistor and a metal oxide semiconductor field effect transistor (MOSFET).

Figure 2:
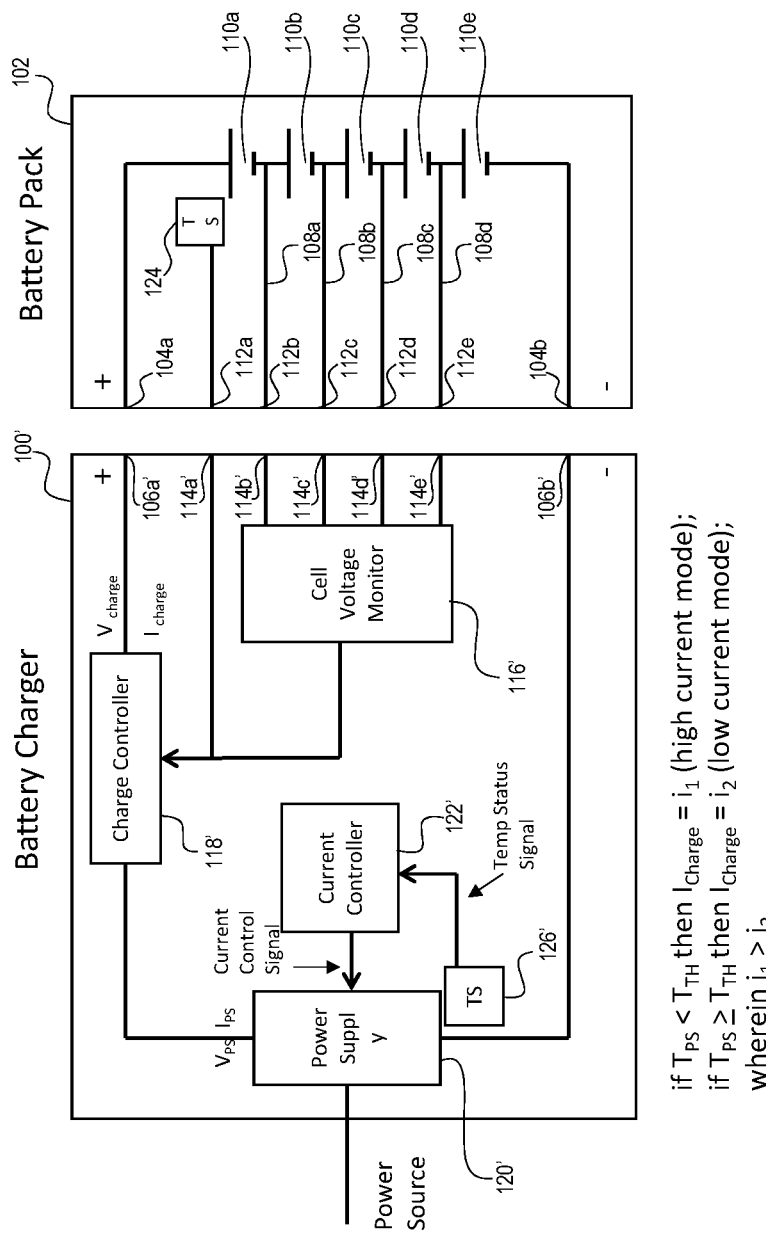
FIG. 2 is a block diagram of a first exemplary embodiment of a battery charger of the present invention.

Referring to FIG. 2, an exemplary embodiment of a battery charger 100' of the present invention is illustrated. FIG. 2 also illustrates a simplified block diagram of a conventional battery pack 102. The battery pack 102 includes a plurality of battery cells 110 and a temperature sensor 124. Many components have not been included to simplify the discussion. The battery charger 100' includes a power supply 120' that is coupled to and receives input power from an external power source. Generally speaking, the power supply 120' takes the power from the external power source and conditions the power for providing a charging power to the battery pack 102. The battery charger 100' also includes a current controller 122'. Generally speaking, the current controller 122' receives information regarding the battery charger 100' and/or battery pack 102 and based on the received information sends current control instructions (signals) to the power supply 120' to affect the conditioning of the input power. The charger 100' also includes a charge controller 118'. Generally speaking, the charge controller 118' starts and stops the charging power from battery charger 100' to the battery pack 102. The charge controller 118' may be a simple switch to open and close the power supply circuit. The charge controller 118' may operate to initially start and finally end the charging cycle or process when a battery pack 102 is initially placed in and electrically coupled to the battery charger 100'.

The battery charger 100' also includes a cell voltage monitor 116', as described above. The cell voltage monitor 116' monitors the voltage of the plurality of battery cells 110 of the battery pack 102 that is coupled to the battery charger 100'. The cell voltage monitor 116' receives voltage information from the plurality of battery cells 110. Based on the cell voltage information the cell voltage monitor 116' outputs a signal representative of the status of the battery cells 110. More particularly, if one or more of the plurality of battery cells 110 exceeds a high voltage threshold the cell voltage monitor 116' outputs a control signal to the charge controller 118' to stop providing the charging current ($I_{charge}$) to the battery pack 102.

The battery charger 100' also includes a temperature sensor (TS) 126'. The temperature sensor 126' is positioned near one or more component of the battery charger 100'. For example, the temperature sensor could be placed near the power supply 120', more particularly, the temperature sensor could be place near a component of the power supply 120', for example, a transformer, a power switch (FET) and/or heat sink of the power supply 120'. In this configuration, the temperature sensor 126' senses the temperature of the power supply component. The temperature sensor 126' is also coupled to the current controller 122'. The temperature sensor 126' may be, for example, a negative temperature coefficient (NTC) sensor. The temperature sensor 126' outputs a signal representative of the temperature of the associated power supply component(s) to the current controller 122'.

Specifically, if the temperature of the monitored power supply component, for example the transformer, is below the temperature threshold, for example 100° C., the temperature sensor 126' will output a low temperature status signal to the current controller 122'. The current controller 122', having received the low temperature status signal from the temperature sensor 126' will send a high current mode current control signal to the power supply 120' to cause the power supply 120' to operate in the high current mode. As a result the power supply 120' will output a high power supply current ($I_{PS}$). On the other hand, if the temperature of the monitored power supply component is at or above the temperature threshold the temperature sensor 126' will output a high temperature status signal to the current controller 122'. The current controller 122', having received the high temperature status signal from the temperature sensor 126' will send a low current mode current control signal to the power supply 120' to cause the power supply 120' to operate in the low current mode.

Figure 3:
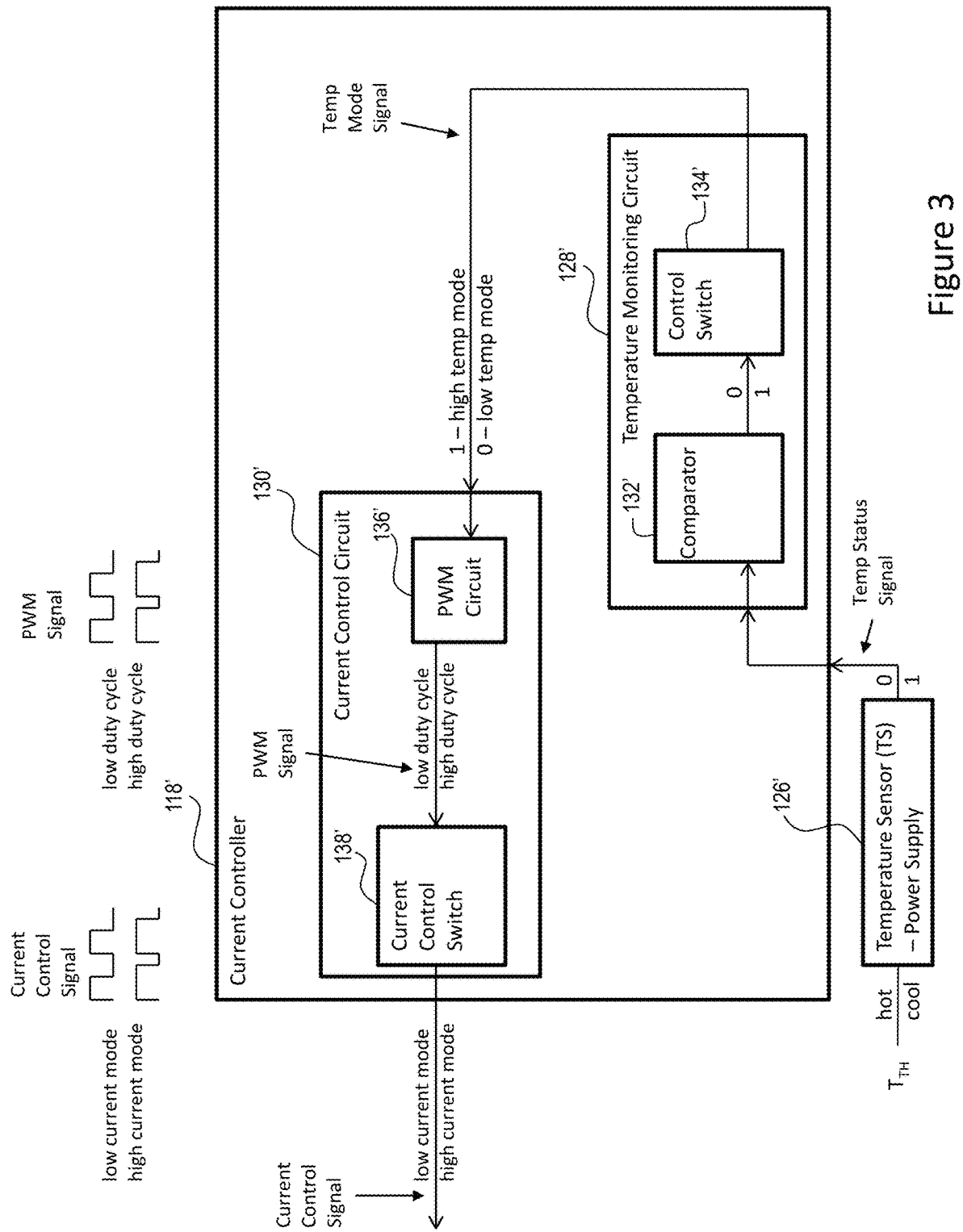
FIG. 3 is a block diagram of an exemplary embodiment of a current controller of the exemplary battery charger of FIG. 2.

With reference to FIG. 3, the current controller 118' and temperature sensor 126' of FIG. 2 are illustrated in more detail. In an exemplary embodiment of the temperature sensor 126', the temperature sensor 126' is a negative temperature coefficient (NTC) sensor. As such, when the temperature of the monitored component is below the temperature threshold (cool) the temperature sensor 126' outputs a high voltage temperature status signal. This is represented by a "1" at the output of the temperature sensor 126' in FIG. 3. When the temperature of the monitored component is at or above the temperature threshold (hot) the temperature sensor 126' outputs a low voltage temperature status signal. This represented by a "0" at the output of the temperature sensor 126'. Alternate embodiments may utilize a positive temperature coefficient (PTC) sensor, which will output signals opposite to the NTC sensor, or other types of temperature sensors.

The temperature status signal is provided to an input of the current controller 118'. In an exemplary embodiment, the current controller 118' includes a temperature monitoring circuit 128' and a current control circuit 130'. An exemplary embodiment of the temperature monitoring circuit 128' includes a comparator 132' and a control switch 134'. An exemplary embodiment of the current control circuit 130' includes a pulse width modulation (PWM) circuit 136' and a current control switch 138'. The temperature monitoring circuit 128' generates and outputs a temperature mode signal that is provided to an input of the current control circuit 130'. The temperature mode signal is then provided to an input of the PWM circuit 136'. The PWM circuit 136' generates and outputs a PWM signal that is provided to an input of the current control switch 138'. The current control switch 138' outputs a current control signal that is output by the current controller 118' and provided to the power supply 120'.

The temperature status signal is provided to an input of the temperature monitoring circuit 128' and thereafter to an input to the comparator 132'. The comparator 132' compares the temperature status signal to a threshold. In the illustrated embodiment, if the temperature status signal is above the threshold (the power supply component is cool) the comparator 132' outputs a control signal to turn on the control switch 134'. The temperature monitoring circuit 128' then outputs a low temperature mode signal. When the PWM circuit 136' receives the low temperature mode signal it generates a high duty cycle PWM signal. The high duty cycle PWM signal is provided to the current control switch 138'. The current control switch 138' outputs a high current mode current control signal to the power supply 120'. As a result, the power supply 120' generates a relatively high output current $I_{PS}$.

If the temperature status signal is below the threshold (the power supply component is hot) the comparator 132' outputs a control signal to turn off the control switch 134'. The temperature monitoring circuit 128' then outputs a high temperature mode signal. When the PWM circuit 136' receives the high temperature mode signal it generates a low duty cycle PWM signal. The low duty cycle PWM signal is provided to the current control switch 138'. The current control switch 138' outputs a low current mode current control signal to the power supply 120'. As a result, the power supply 120' generates a relatively low output current $I_{PS}$.

Alternate embodiments of the current controller 118' may be implemented to provide a relatively high current mode current control signal to the power supply 120' when the monitored power supply component temperature $T_{PS}$ is below the predefined temperature threshold $T_{TH}$ and a relatively low current mode current control signal to the power supply 120' when the monitored power supply component temperature $T_{PS}$ is above the predefined temperature threshold $T_{TH}$.

Figure 4:
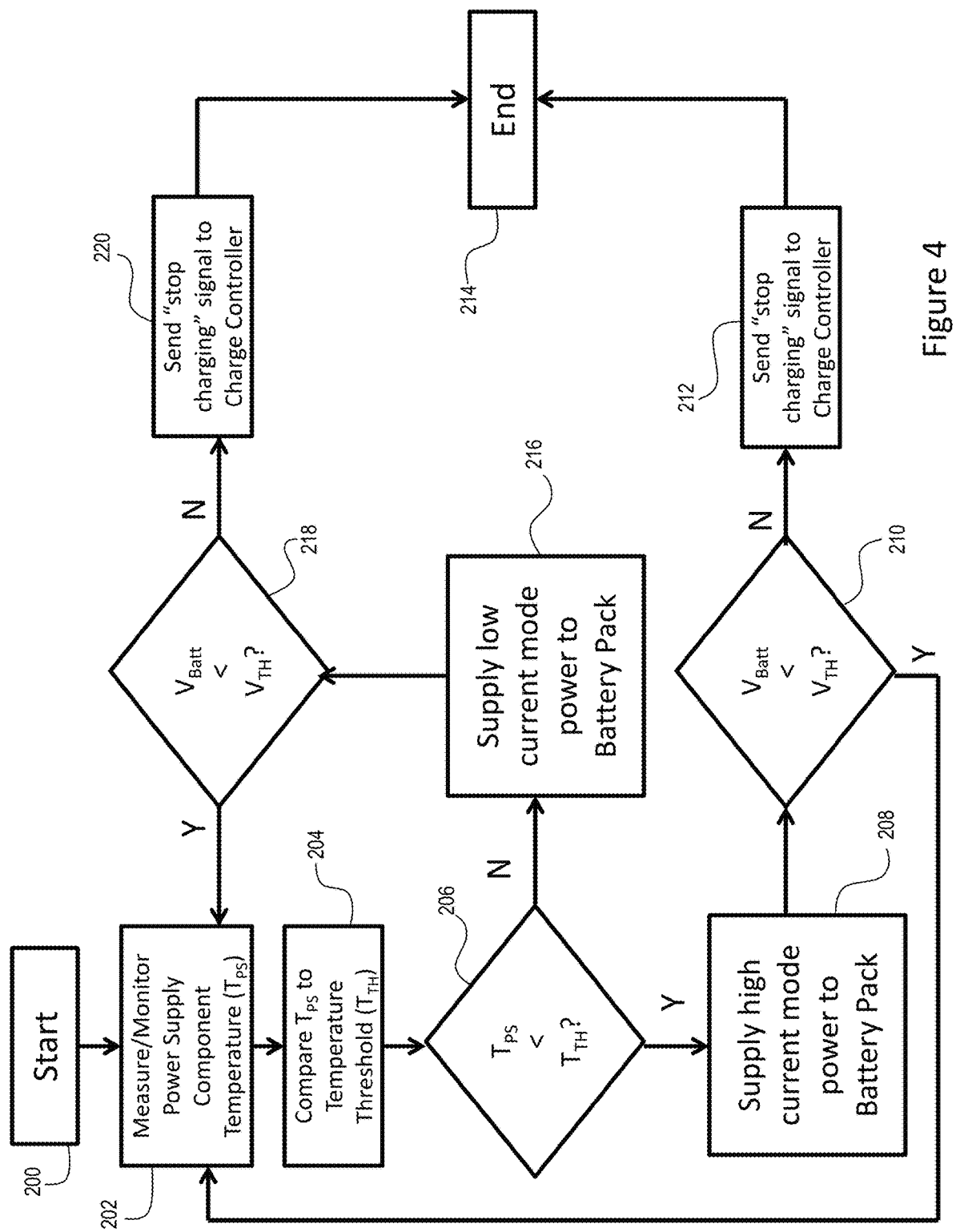
FIG. 4 is a flow chart of an exemplary embodiment of a method of operating the exemplary battery charger of FIG. 2.

FIG. 4 illustrates an exemplary flow chart for a battery pack charging process carried out by the exemplary embodiment of FIG. 2. The process starts (step 200) when a battery pack 102 is placed in and electrically coupled to the battery charger 100'. The battery charger 100' measures and monitors a power supply component temperature ($T_{PS}$) (step 202), for example the power transformer. The battery charger 100' compares the power supply component temperature ($T_{PS}$) to a predefined temperature threshold ($T_{TH}$) (step 204), for example 100° C. If $T_{PS}$ is below $T_{TH}$ (step 206) then the battery charger 100' charges the battery pack 102 in a high current mode (step 208); in other words the battery charger 100' provides the battery pack 102 with a relatively high charging current, for example 3 Amps. The battery charger 100' also monitors a voltage of one or more of the plurality of battery cells 110 of the battery pack 102 $V_{BATT}$. Specifically, the cell voltage monitor 116' determines, using signals from the cell taps 108 if the voltage of one or more of the plurality of battery cells 110 $V_{BATT}$ is less than a voltage threshold $T_{TH}$ (step 210). If $V_{BATT}$ is less than $V_{TH}$ then the battery charger 100' continues to monitor $T_{PS}$ (step 202), compare $T_{PS}$ to $T_{TH}$ (step 204) and supply the appropriate current mode power to the battery pack 102. If $V_{BATT}$ becomes equal to or greater than $V_{TH}$ then the cell voltage monitor 116' sends a "stop charging" control signal to the charge controller 118' (step 212), which in turn opens up the charge controller switch to stop providing the charging current $I_{charge}$ to the battery pack 102 and ends the charging process (step 214).

If $T_{PS}$ becomes equal to or greater than $T_{TH}$ (step 206) then the battery charger 100' charges the battery pack 102 in a low current mode (step 216); in other words the battery charger 100' provides the battery pack 102 with a relatively low charging current, for example 2 Amps. As above, the battery charger 100' also monitors $V_{BATT}$ and if $V_{BATT}$ is less than $V_{TH}$ (step 218) then the battery charger 100' continues to monitor $T_{PS}$ (step 202), compare $T_{PS}$ to $T_{TH}$ (step 204) and supply the appropriate current mode power to the battery pack 102. If $V_{BATT}$ becomes equal to or greater than $V_{TH}$ then the cell voltage monitor 116' sends a "stop charging" control signal to the charge controller 118' (step 220), which in turn opens up the charge controller switch to stop providing the charging current $I_{charge}$ to the battery pack 102 and ends the charging process (step 214).

Figure 1:
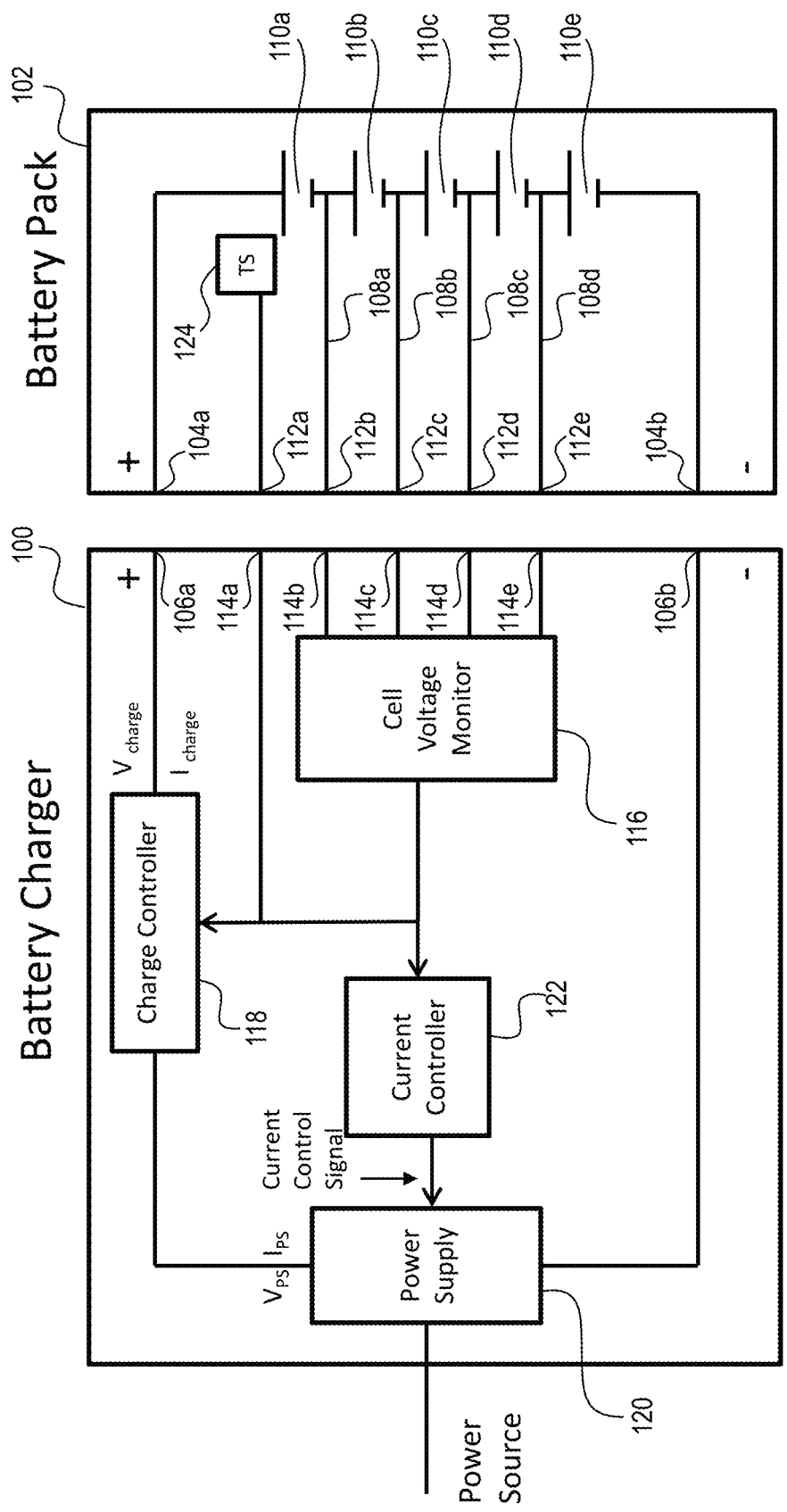
FIG. 1 is a block diagram of a conventional battery charger.
Figure 5:
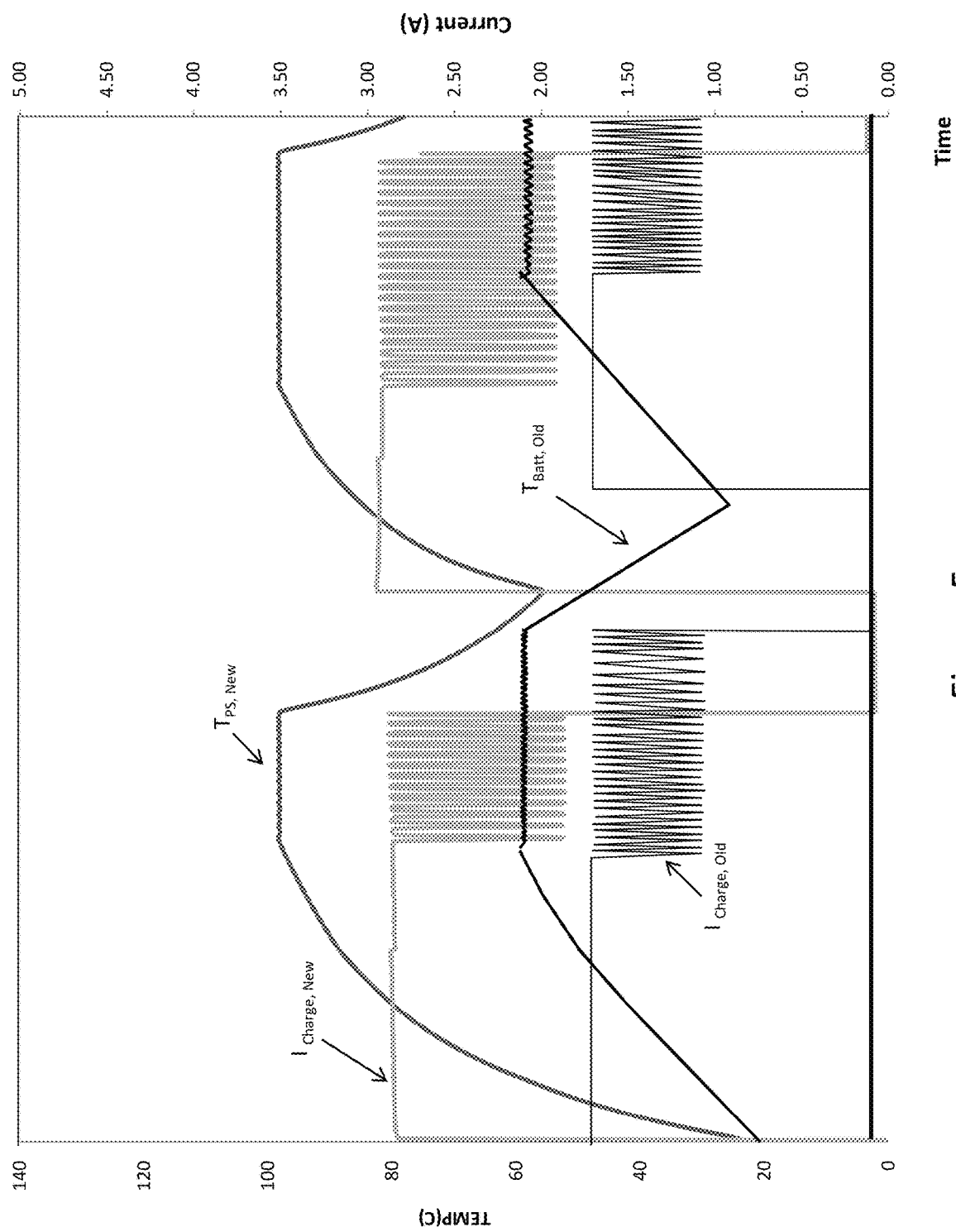
FIG. 5 is a graph illustrating a first exemplary method of operating the exemplary battery charger of FIG. 2 in comparison to a method of operating a conventional battery charger.

FIGS. 5-8 illustrate graphs comparing conventional battery charging methods (old) and battery charging methods disclosed in the instant application (new). FIG. 5 illustrates a conventional battery charging method that could be implemented with the prior art battery charger illustrated in FIG. 1. As illustrated in FIG. 5, the conventional battery charger and method of charging a battery pack begin charging the battery pack at a first charging current, for example approximately 1.75 Amps. The battery pack temperature sensor monitors the temperature of the battery pack and/or one or more of the plurality of battery cells ($T_{BATT, Old}$). When the current controller receives a signal $T_{BATT, Old}$ has reached or exceeded a temperature threshold, for example approximately 60° C., the current controller lowers the charging current ($I_{Charge, Old}$) to a second, lower charging current, for example approximately 1 Amp. When $T_{BATT}$, old falls below the temperature threshold the current controller raises $I_{Charge, Old}$ back to the first charging current. This process continues until the cell voltage monitor receives a signal from the battery pack that the battery cells have reached their full charge. The cell voltage monitor then sends a signal to the charge controller to stop the charging process.

FIG. 5 also illustrates the method described above in the flowchart of FIG. 4. In contrast to the conventional method, when charging a similar battery pack 102 as in the conventional process, because the novel charging process of the instant application monitors the temperature of a component of the power supply ($T_{PS, New}$) and uses $T_{PS, New}$ to control the charging current ($I_{Charge, New}$), the battery charger 100' may implement a higher first $I_{Charge, New}$, for example approximately 3 Amps, than in the conventional battery charger 100 and may implement a higher second $I_{Charge, New}$, for example approximately 2 Amps, than in the conventional battery charger 100. The temperature threshold $T_{TH}$ for the instant process may also be set higher, for example approximately 100° C. As such, the battery pack 102 will be charged more quickly and also to a higher final capacity than with the conventional battery charger 100.

Figure 6:
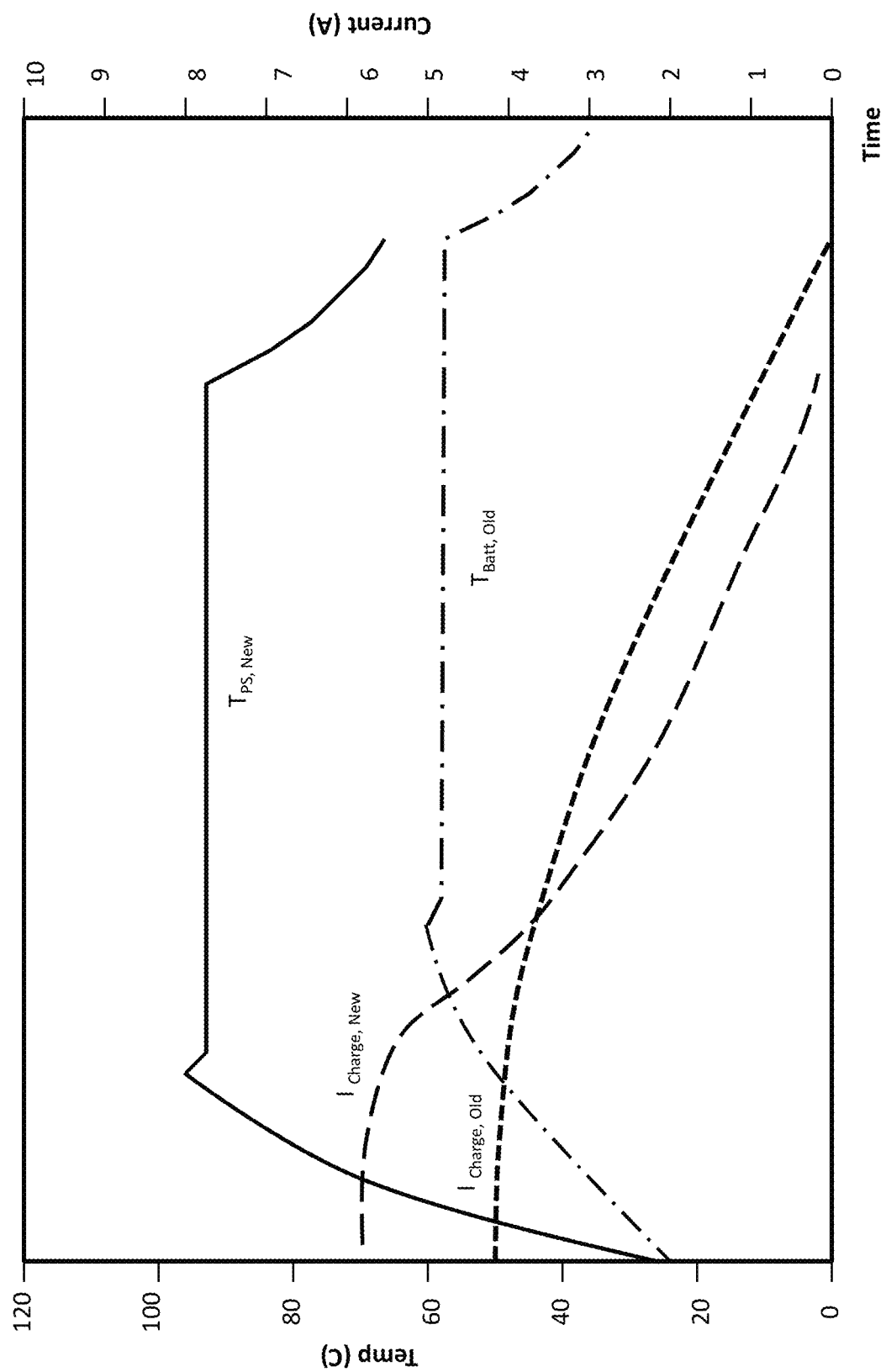
FIG. 6 is a graph illustrating a second exemplary method of operating the exemplary battery charger of FIG. 2 in comparison to a method of operating a conventional battery charger.

FIG. 6 illustrates a similar but slightly different charging methodology than described above. The conventional battery charger 100 starts charging the battery pack 102 with a relatively low and relatively constant $I_{charge, Old}$, for example approximately 4 Amps and monitors $T_{BATT, Old}$. When $T_{BATT, Old}$ reaches or exceeds a threshold, for example approximately 60° C., the battery charger 100 continuously lowers $I_{Charge, Old}$ to maintain $T_{BATT, Old}$ at a constant level until the battery pack 102 reaches a final capacity.

In contrast to the conventional method, when charging a similar battery pack 102, the instant battery charger 100' starts charging the battery pack 102 with a relatively high and relatively constant $I_{Charge, New}$ that is higher than in the conventional charging process, for example approximately 6 Amps and monitors $T_{PS, New}$. When $T_{PS, New}$ reaches or exceeds a threshold, for example approximately 100° C., the battery charger 100' continuously lowers $I_{Charge, New}$ to maintain $T_{BATT, New}$ at a constant level until the battery pack 102 reaches a final capacity. As such, the battery pack 102 will be charged more quickly and also to a higher final capacity than with the conventional battery charger 100.

Figure 7:
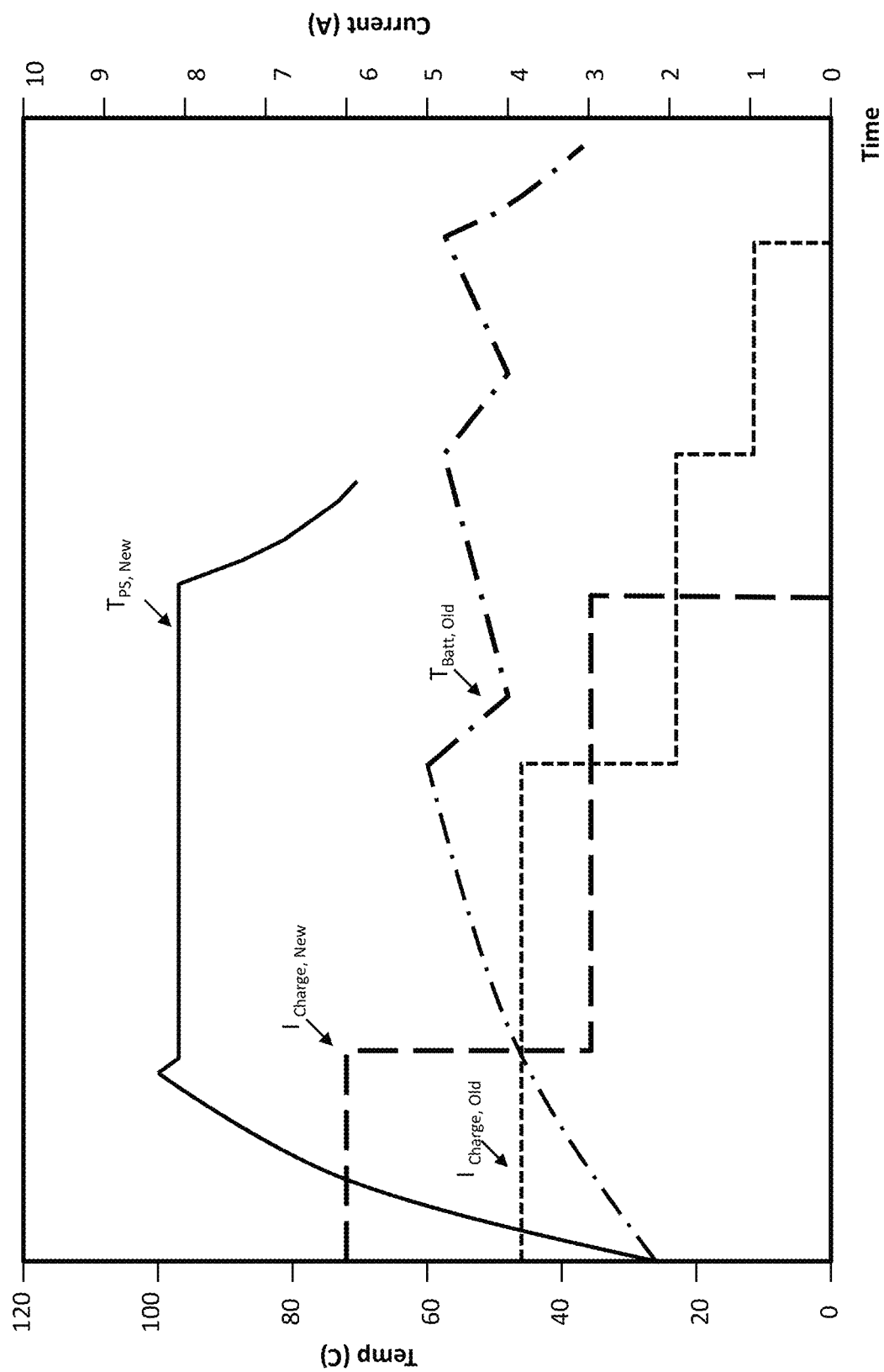
FIG. 7 is a graph illustrating a third exemplary method of operating the exemplary battery charger of FIG. 2 in comparison to a method of operating a conventional battery charger.

FIG. 7 illustrates a similar but slightly different charging methodology than described above. The conventional battery charger 100 starts charging the battery pack 102 with a relatively low and constant $I_{Charge, Old}$, for example approximately 4 Amps and monitors $T_{BATT, Old}$. When $T_{BATT, Old}$ reaches or exceeds a threshold, for example approximately 60° C., the battery charger 100 lowers $I_{Charge, Old}$ to a new constant current, for example approximately 2 Amps. $T_{BATT, Old}$ will consequently drop below the predefined temperature threshold then start to rise again. When $T_{BATT, Old}$ reaches or exceeds the threshold again the battery charger lowers $I_{Charge, Old}$ again to a new constant current, for example approximately 1 Amp. $T_{BATT, Old}$ will consequently drop below the predefined temperature threshold then start to rise again. At this charging level the battery pack 102 will charge until it reaches a final capacity.

In contrast to the conventional method, when charging a similar battery pack 102, the instant battery charger 100' starts charging the battery pack 102 with a relatively high and relatively constant $I_{Charge, New}$ that is higher than in the conventional charging process, for example approximately 6 Amps and monitors $T_{PS, New}$. When $T_{PS, New}$ reaches or exceeds a threshold, for example approximately 100° C., the battery charger lowers $I_{Charge, New}$ to a new constant current, for example 3 Amps, to maintain $T_{BATT, New}$ at a constant level until the battery pack 102 reaches a final capacity. As such, the battery pack 102 will be charged more quickly and also to a higher final capacity than with the conventional battery charger 100.

Figure 8:
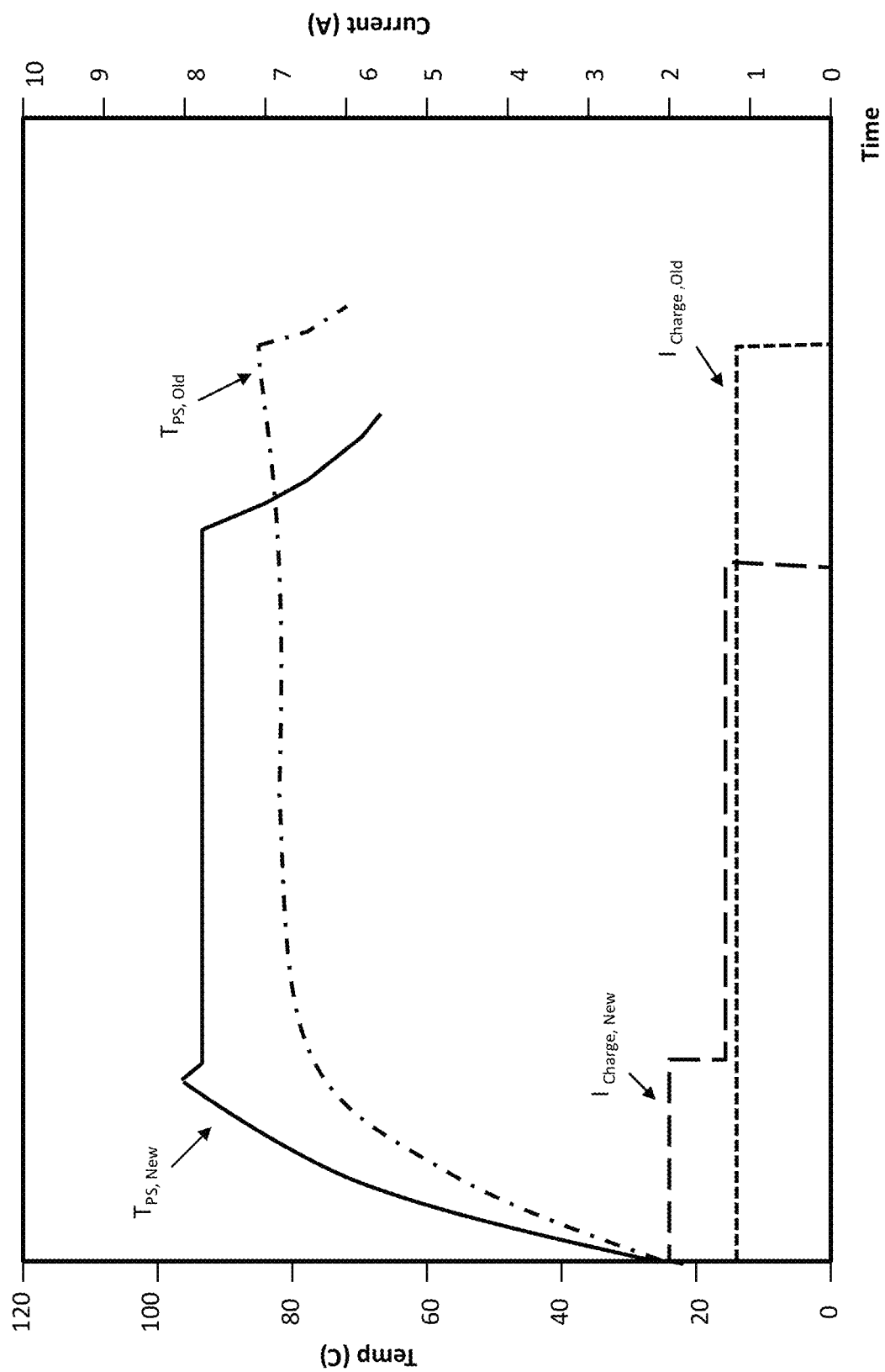
FIG. 8 is a graph illustrating a fourth exemplary method of operating the exemplary battery charger of FIG. 2 in comparison to a method of operating a conventional battery charger.

FIG. 8 illustrates another charging methodology comparison between a conventional method and a method of the instant application. In the conventional methodology, the battery charger 100 utilizes a relatively low, constant charging current ($I_{Charge, Old}$), for example 1 Amp, to charge the battery pack 102. This charging current is applied until the battery pack 102 reaches a final capacity. If one were to measure a temperature of a component of the conventional battery charger power supply 120 ($T_{PS, Old}$) one would see that $T_{PS, Old}$ would only rise to approximately 80° C.

In contrast to the conventional method, when charging a similar battery pack 102, the instant battery charger 100' starts charging the battery pack 102 with a relatively high and relatively constant $I_{Charge,\ New}$ that is higher than in the conventional charging process, for example approximately 2 Amps and monitors $T_{PS,\ New}$. When $T_{PS,\ New}$ reaches or exceeds a threshold, for example approximately 100° C., the battery charger 100' lowers $I_{Charge,\ New}$ to new constant charging current, for example approximately 1.25 Amps, to maintain $T_{BATT,\ New}$ at a constant level until the battery pack 102 reaches a final capacity. As is illustrated in FIG. 8, the instant charging process allows $T_{PS,\ New}$ to rise to a higher threshold than $T_{PS,\ Old}$. As such, the battery pack 102 will be charged more quickly and also to a higher final capacity than with the conventional battery charger 100.

Another charging process of the instant application relies on the fact that when lithium-ion battery cells 110 reach their high voltage threshold, as defined by their manufacturer and the charging process is accordingly stopped, the battery cell 110 will "relax." In other words, once the battery cell 110 reaches its high voltage threshold when the charging process is stopped, the voltage of the battery cell 110 will drop below the high voltage threshold leaving the battery pack 102 charged below its maximum capacity. The instant charging process recognizes this relaxation and provides additional charging current to the battery cells.

Figure 9:
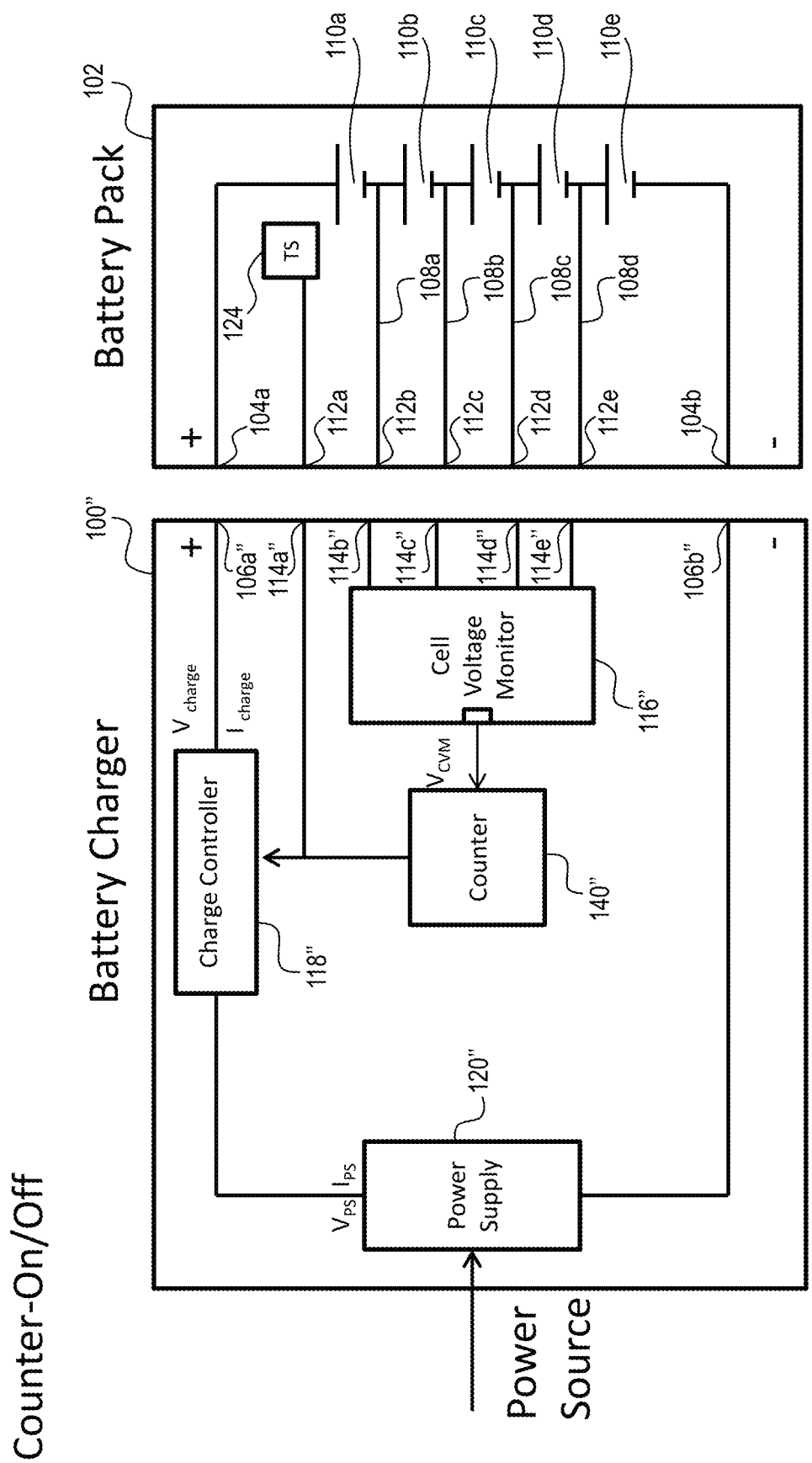
FIG. 9 is a block diagram of a second exemplary embodiment of a battery charger of the present invention.

FIG. 9 illustrates a block diagram of a battery charger 100" and a battery pack 102 of the present invention. Many battery charger and battery pack components have not been illustrated to simplify the discussion. One of ordinary skill in the art would understand and appreciate all of the components necessary to implement the disclosed battery charger and battery pack.

The battery charger 100" includes a "+" and a "−" power terminal 106a", 106b" for providing charging power to a coupled battery pack 102, as will be discussed in more detail below. The battery charger 100" also includes a plurality of signal terminals 114" for receiving signal information from the battery pack 102, as will be discuss in more detail below. The battery charger 100" also includes a cell voltage monitor 116" similar to the cell voltage monitor 116' described above. The cell voltage monitor 116" is coupled to the plurality of signal terminals 114" and receives the signal information from the battery pack 102. The battery charger 100" includes a power supply 120", similar to the power supply 120' described above, which is coupled to and receives input power from an external power source. The battery charger 100" also includes a charge controller 118" similar to the charge controller 118' described above. The battery charger 100" also includes a counter 140". The counter 140" includes an input coupled to an output of the cell voltage monitor 116". The counter 140" input receives a voltage information signal ($V_{CVM}$) from the cell voltage monitor output. The counter 140" also includes an output coupled to an input of the charge controller 118". The counter 140" provides a control signal to the charge controller 118".

Figure 10:
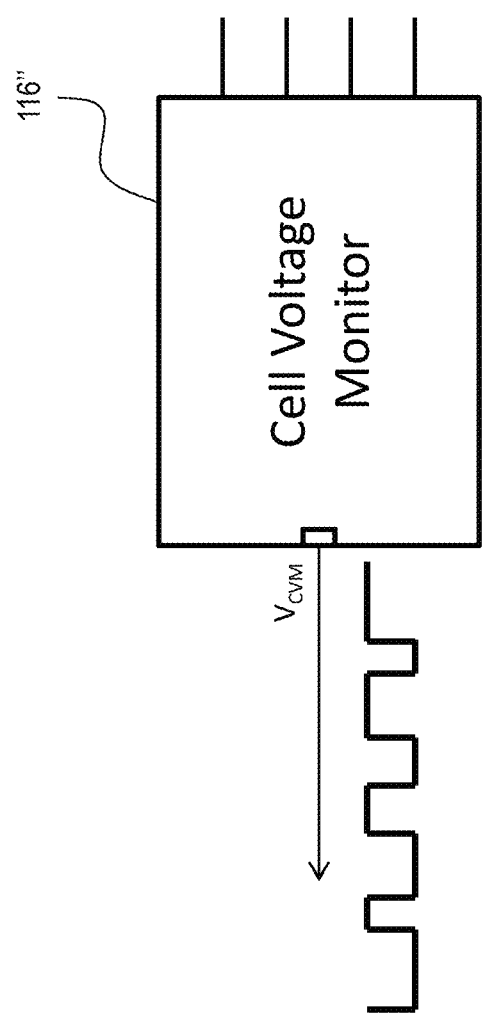
FIG. 10 is a block diagram of an exemplary cell voltage monitor of the exemplary embodiment of the battery charger of FIG. 9.
Figure 11:
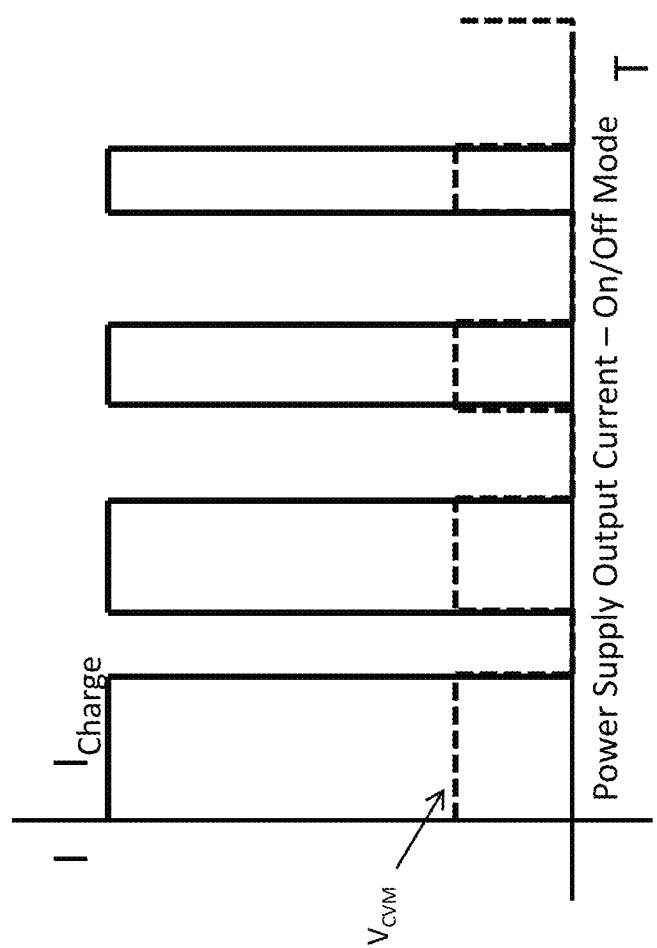
FIG. 11 is a graph illustrating an exemplary relationship between the battery and the charging current of the exemplary battery charger of FIG. 9.

As noted above, when the battery pack 102 is electromechanically coupled to the battery charger 100" the battery pack "+" terminal 104a and the battery pack "−" terminal 104b are coupled to the battery charger "+" terminal 106a and the battery charger "−" terminal 106b, respectively and the battery pack signal terminals 112 are coupled to the battery charger signal terminals 114. Once the battery pack 102 is coupled to the battery charger 100" the cell voltage monitor 116" begins monitoring the voltage levels of the battery pack battery cells 102. FIG. 10 illustrates an exemplary embodiment of a cell voltage monitor 116" and its output signal $V_{CVM}$. In this exemplary embodiment, if all of the battery cell voltages are below their high voltage level threshold the cell voltage monitor 116" will output a high $V_{CVM}$ signal. When the $V_{CVM}$ is high the counter 140" will output a control signal to the charge controller 118" to provide charging power/current to the battery pack 102. As illustrated in FIG. 11, when the initial output $V_{CVM}$ is high the charge controller 118" will output the charging current ($I_{Charge}$) provided from the power supply 120".

When the cell voltage monitor 116" receives information from the battery pack 102 that the voltage level of one or more of the plurality of battery cells 110 and/or the voltage level of the battery pack 102 has exceeded the corresponding high voltage level threshold the cell voltage monitor 116" will output a low $V_{CVM}$ signal. When the $V_{CVM}$ transitions to the low signal the counter 140" will count the transition and will output a control signal to the charge controller 118" to not provide charging power/current to the battery pack 102. As illustrated in FIG. 11, when the output $V_{CVM}$ is low the charge controller output $I_{Charge}$ will be zero.

As noted above, after the initial charging current is no longer provided to the battery pack 102 and battery cells 110, the battery cells 110 will relax—their voltage level will drop—to a point where the voltage level of the cell(s) 110 that were above the high voltage level threshold will drop below the high voltage level threshold. As a result, the cell voltage monitor 116" will once again output a high $V_{CVM}$ signal. When this occurs the counter 140" will output a control signal to the charge controller 118" to provide charging power/current to the battery pack 102. Again, after a period of charging time the voltage level of one or more of the plurality of battery cells 110 will exceed the high voltage level threshold. Again, the cell voltage monitor 116" will receive information indicating this status. And again, the cell voltage monitor 116" will output a low $V_{CVM}$ signal and the counter 140" will count the transition and will output a control signal to the charge controller 118" to not provide charging power/current to the battery pack 102. The counter 140" will be configured to include a predefined count maximum N. When the counter 140" count reaches the count maximum N the counter 140" will end the charging process. In the illustrated exemplary embodiment, N is set to four (4) and as such, the cell voltage monitor 116" will transition four times and the counter 140" will count to four upon which time the charging process will end.

Figure 12:
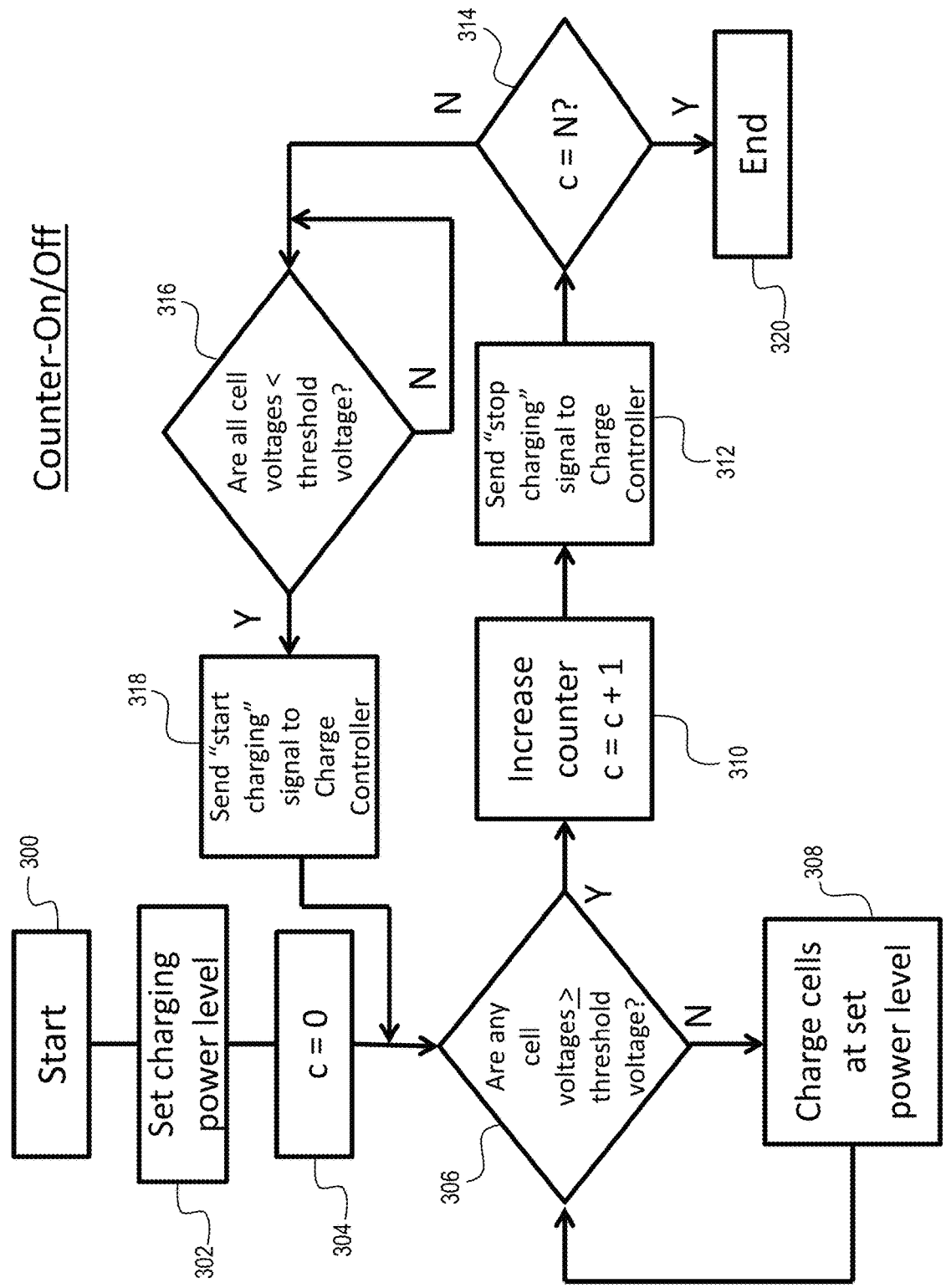
FIG. 12 is a flow chart of an exemplary embodiment of a method of operating the exemplary battery charger of FIG. 9.

FIG. 12 illustrates a flow chart of an exemplary charging process carried out by the battery charger 100" of FIG. 9. Specifically, when the battery pack 102 is coupled to the battery charger 100" the charging process will begin (step 300). The charging power level is set (step 302). The counter 140" sets its count (c) to zero (step 304). In the next step, the cell voltage monitor 116" determines if the voltage level of any of the plurality of battery cells 110 of the battery pack 102 is greater than or equal to the high voltage level threshold (step 306). If the voltage level of none of the plurality of cells 110 are greater than or equal to the high voltage level threshold then the battery charger 100" charges the battery pack 102 at the set power level (step 308). However, if the cell voltage monitor 116" determines that the voltage level of any of the plurality of battery cells 110 of the battery pack 102 is greater than or equal to the high voltage level threshold then the counter 140" increases the count by one (step 310) and the counter 140" sends a "stop charging" signal to the charge controller 118" (step 312). In the next step the counter 140" determines if the count has reached the predefined maximum count N (step 314). If the counter 140" has not reached the maximum count N the process waits for the battery cells to relax (step 316). In other words, the cell voltage monitor 116" continues to monitor the voltage level of the battery cells 110 to determine if/when the voltage level of all of the cells 110 falls below the high voltage level threshold. When the voltage level of all of the battery cells 110 has fallen below the high voltage level threshold the counter 140" will send a "start charging" signal to the charge controller 118" (step 318). Thereafter, the process will return to the step 306 in which the cell voltage monitor 116" continues to monitor the voltage level of the battery cells 110 to determine if the voltage level of any of the battery cells 110 is greater than or equal to the high voltage level threshold. If the count of the counter 140" has reached the predefined maximum count N then the charging process will be stopped (step 302).

Figure 13:
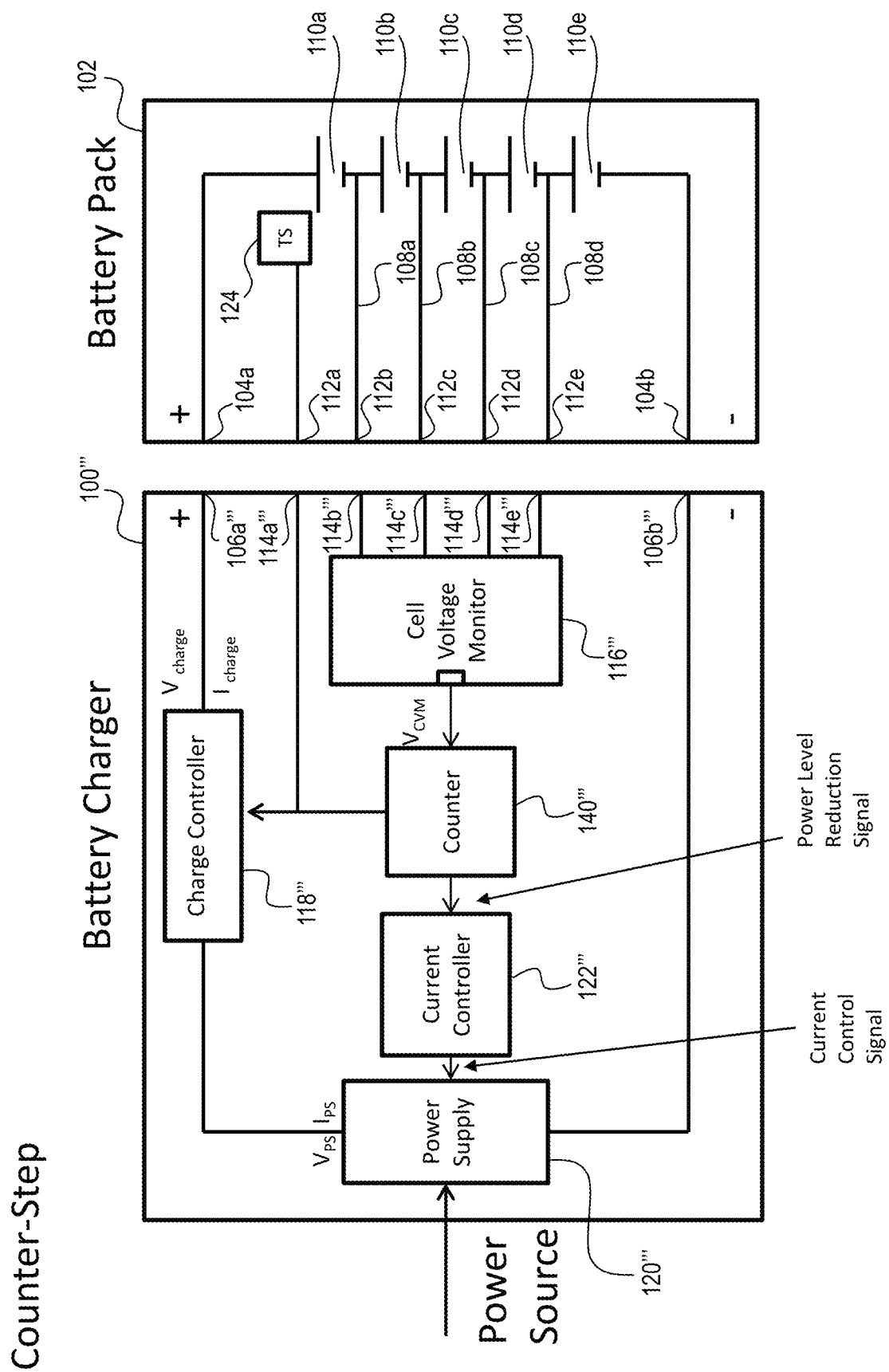
FIG. 13 is a block diagram of a third exemplary embodiment of a battery charger of the present invention.

FIG. 13 illustrates an alternate exemplary embodiment of a battery charger 100''' and battery pack 102 of the instant application. In addition to the components described above with respect to FIG. 9, this exemplary embodiment includes a current controller 122'''. The current controller 122''' includes an input coupled to an additional output of the counter 140'''. The current controller 122''' also includes an output coupled to an input of the power supply 120'''.

The current controller 122''' is similar to the current controller 122' described above with respect to FIG. 2. In this exemplary embodiment, when the $V_{CVM}$ signal transitions from high to low instead of turning the power/current from the battery charger 100''' to the battery pack 102 off, the power/current from the battery charger 100''' to the battery pack 102 is reduced. While the counter 140''' of this exemplary embodiment still counts the number of transitions of the $V_{CVM}$ signal it does not send a control signal to the charge controller 118''' to stop the charging process until the count reaches the predefined count maximum N. Instead, when the $V_{CVM}$ signal transitions from high to low the counter 140''' sends a power level reduction signal to the current controller 122'''. The power level reduction signal indicates that the voltage level of one or more of the battery cells 110 has reached or exceeded the high voltage level threshold and a transition of the output of the cell voltage monitor 116''' has taken place.

Figure 14:
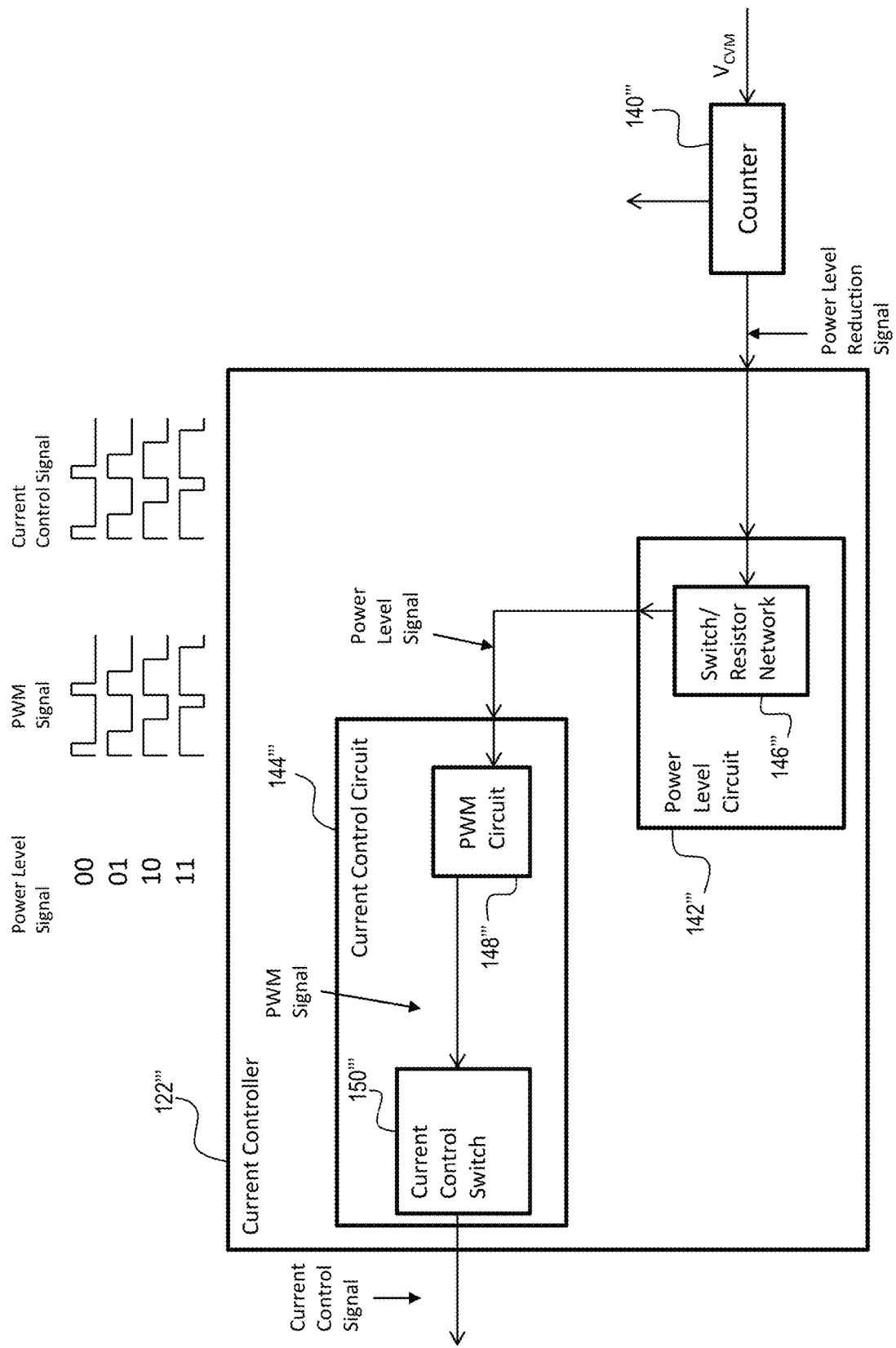
FIG. 14 is a block diagram of an exemplary embodiment of a current controller of the exemplary battery charger of FIG. 13.

In the illustrated exemplary embodiment of FIG. 14, the current controller 122''' includes an exemplary power level circuit 142''' and an exemplary current control circuit 144". When the power level circuit 142''' receives the power level reduction signal from the counter 140''' a switch/resistor network 146''' of the power level circuit 142''' provides a power level signal to the current control circuit 144'''. The power level signal indicates that a power level of the power supply 120''' should be decreased. One of ordinary skill in the art will understand and appreciate how to configure a switch/resistor network 146''' to send an appropriate signal to the current control circuit 144''' to indicate a reduction in power level of the power supply 120'''.

The current control circuit 144''' includes a PMW circuit 148''' and a current control switch 150". The PWM circuit 148''' receives the power level signal from the power level circuit 142". Based on the power level signal received from the power level circuit 142''', the PWM circuit 148''' generates a corresponding PWM signal. In the exemplary embodiment, the PWM circuit 148''' is able to produce four different duty cycle signals. The PWM signal is provided from the PWM circuit 148''' to the current control switch 150'''. The current control switch 150''' outputs a current control signal corresponding to the input PWM signal. The current control signal is provided to an input of the power supply 120". Based on the input current control signal the power supply 120''' will output a corresponding constant current power supply current ($I_{PS}$).

Figure 15:
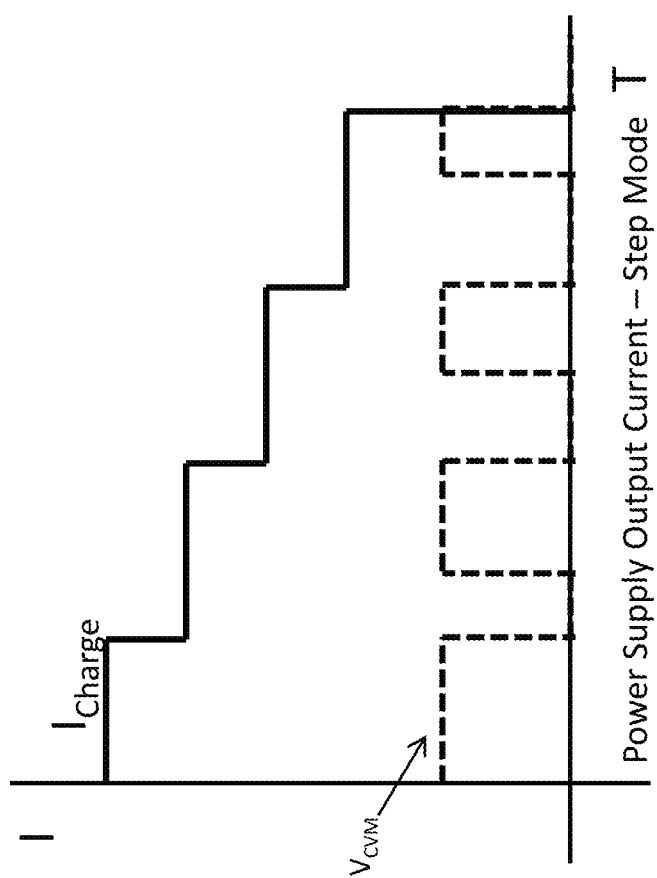
FIG. 15 is a graph illustrating an exemplary relationship between the battery and the charging current of the exemplary battery charger of FIG. 13.

With regard to the exemplary embodiment of FIGS. 13 and 14, FIG. 15 illustrates a corresponding exemplary chart comparing the output of the cell voltage monitor 116''' and the charging current $I_{Charge}$. For example, when a battery pack 102 is first coupled to the battery charger 100''' the power level circuit 142''' will provide a first (highest) level power level signal (11) to the current control circuit 144". Based on this first power level signal the PWM circuit 148''' will provide the highest level duty cycle signal (which corresponds to the 11 power level signal) to the current control switch 150". The current control switch 150''' and therefore the current control circuit 144''' will output the highest level current control signal to the power supply 120''' to provide the highest level power supply current $I_{PS}$—for example 6 Amps— to the charge controller 118''' and the battery pack 102. When the cell voltage monitor 116''' receives a first indicator that the voltage level of one or more of the plurality of battery cells 110 has reached or exceeded the high voltage level threshold and outputs a low $V_{CVM}$ signal the counter 140''' will output a power level reduction signal to the current controller 122". As a result, the power level circuit 142''' will output a second (second highest) level power level signal (10) to the current control circuit 144'''. Based on this second power level signal the PWM circuit 148''' will provide the second highest level duty cycle signal (which corresponds to the 10 power level signal) to the current control switch 150'''. The current control switch 150''' and therefore the current control circuit 144''' will output the second highest level current control signal to the power supply 120''' to provide the second highest level power supply current $I_{PS}$—for example 4 Amps— to the charge controller 118''' and the battery pack 102.

When the cell voltage monitor 116''' receives a second indicator that the voltage level of one or more of the plurality of battery cells 110 has reached or exceeded the high voltage level threshold (after relaxing as described above) and outputs another low $V_{CVM}$ signal the counter 140''' will output a power level reduction signal to the current controller 122". As a result, the power level circuit 142''' will output a third (third highest) level power level signal (01) to the current control circuit 144'''. Based on this third power level signal the PWM circuit 148''' will provide the third highest level duty cycle signal (which corresponds to the 01 power level signal) to the current control switch 150". The current control switch 150''' and therefore the current control circuit 144''' will output the third highest level current control signal to the power supply 120''' to provide the third highest level power supply current $I_{PS}$—for example 2 Amps— to the charge controller 118''' and the battery pack 102.

When the cell voltage monitor 116''' receives a third indicator that the voltage level of one or more of the plurality of battery cells 110 has reached or exceeded the high voltage level threshold (again, after relaxing as described above) and outputs another low $V_{CVM}$ signal the counter 140''' will output a power level reduction signal to the current controller 122". As a result, the power level circuit 142''' will output a fourth (fourth highest) level power level signal (00) to the current control circuit 144". Based on this fourth power level signal the PWM circuit 148''' will provide the fourth highest level duty cycle signal (which corresponds to the 00 power level signal) to the current control switch 150'''. The current control switch 150''' and therefore the current control circuit 144''' will output the fourth highest level current control signal to the power supply 120''' to provide the fourth highest level power supply current $I_{PS}$—for example 1 Amp— to the charge controller 118''' and the battery pack 102.

Figure 16:
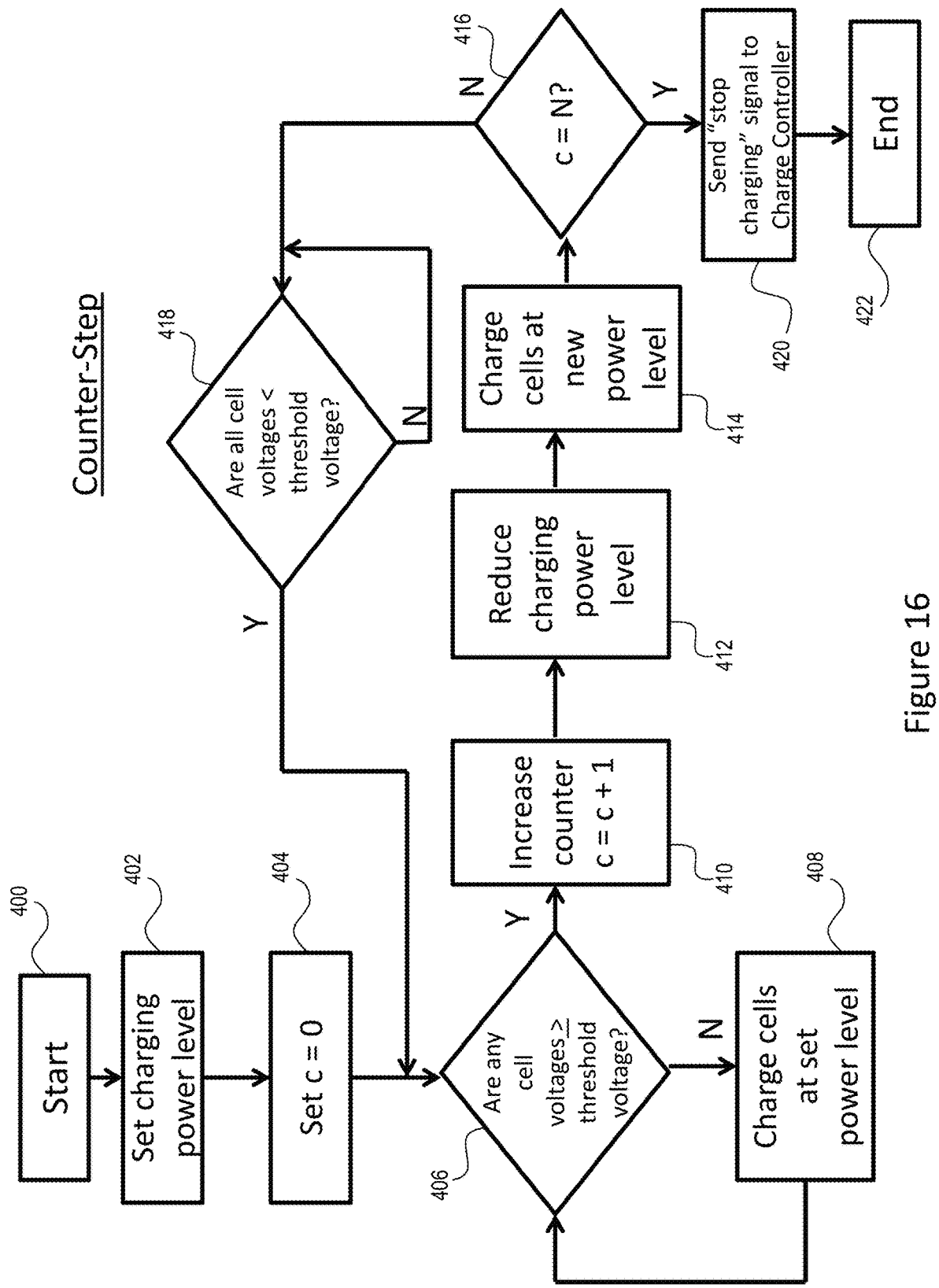
FIG. 16 is a flow chart of an exemplary embodiment of a method of operating the exemplary battery charger of FIG. 13.

FIG. 16 illustrates a flow chart of an exemplary charging process carried out by the battery charger 100''' of FIG. 13. Specifically, when the battery pack 102 is coupled to the battery charger 100''' the charging process will begin (step 400). The battery charger 100''' sets the charging power level to a predetermined level (step 402), e.g. 6 Amps. The counter 140''' sets its count (c) to zero (step 404). In the next step, the cell voltage monitor 116''' determines if the voltage level of any of the plurality of battery cells 110 of the battery pack 102 is greater than or equal to the high voltage level threshold (step 406). If the voltage level of none of the plurality of cells 110 are greater than or equal to the high voltage level threshold then the battery charger 100''' charges the battery pack 102 at the set power level (step 408). However, if the cell voltage monitor 116''' determines that the voltage level of any of the plurality of battery cells 110 of the battery pack 102 is greater than or equal to the high voltage level threshold the cell voltage monitor 116''' will output a low signal (see FIG. 15) and then the counter 140''' will increase the count by one (step 410) and reduces the charging power supplied by the power supply 120''' (step 412), e.g., 4 Amps and charges the battery cells 110 at the new power level (step 414). In the next step the counter 140''' determines if the count has reached the predefined maximum count N (step 416). If the counter 140''' has not reached the maximum count N the process waits for the battery cells 110 to relax (step 418). In other words, the cell voltage monitor 116''', while maintaining a low $V_{CVM}$, continues to monitor the voltage level of the battery cells 110 to determine if/when the voltage level of all of the cells 110 falls below the high voltage level threshold. When the voltage level of all of the battery cells 110 has fallen below the high voltage level threshold the cell voltage monitor 116''' will output a high $V_{CVM}$ (see FIG. 15) and the process will return to the step 406 in which the cell voltage monitor 116''' continues to monitor the voltage level of the battery cells 110 to determine if the voltage level of any of the battery cells 110 is greater than or equal to the high voltage level threshold. If the count of the counter 140''' has reached the predefined maximum count N then the counter will send a "stop charging" signal to the charge controller 118''' and the charging process will be stopped (step 422).

Figure 17:
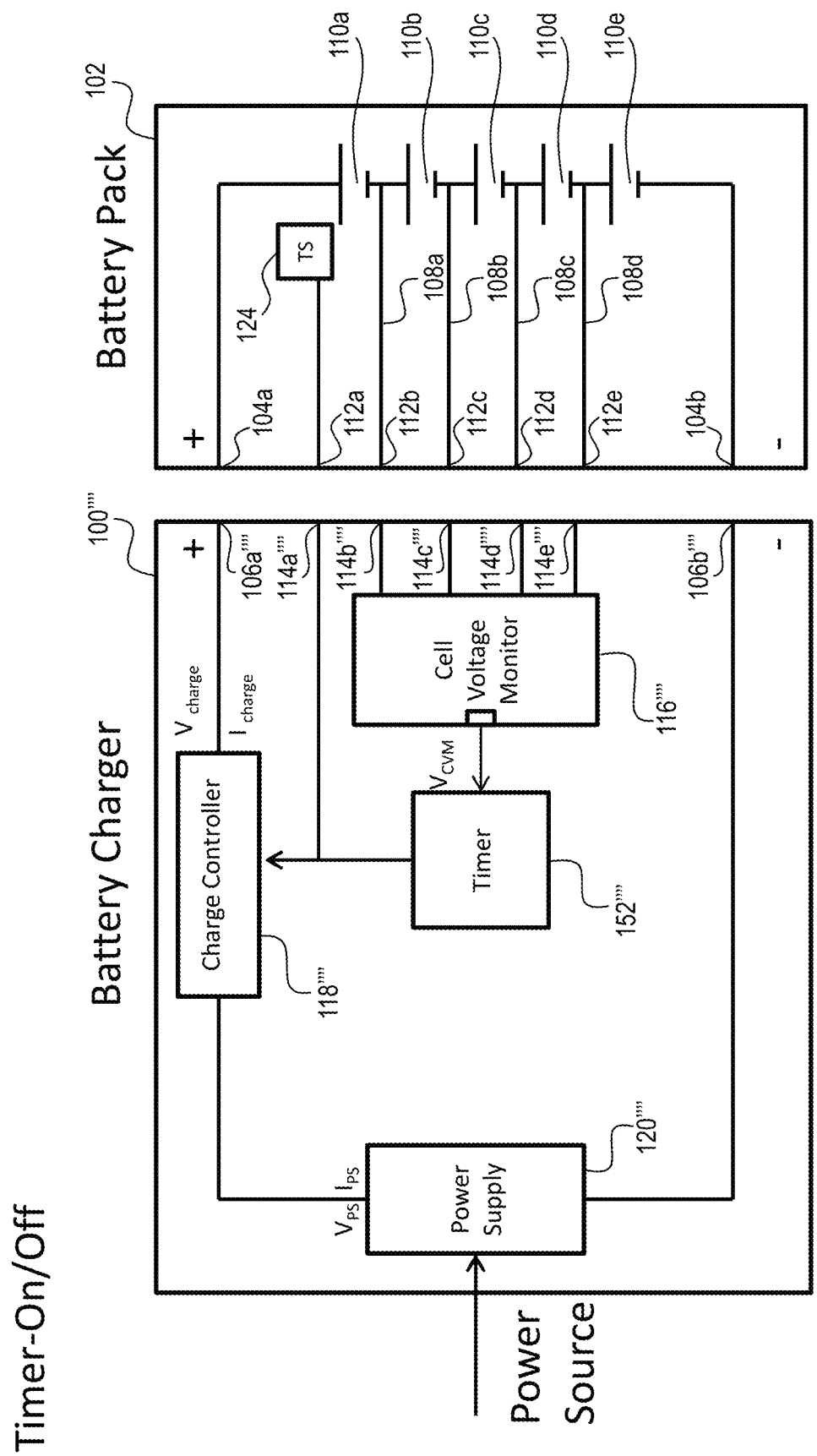
FIG. 17 is a block diagram of a fourth exemplary embodiment of a battery charger of the present invention.

FIG. 17 illustrates another alternate exemplary embodiment of a battery charger 100'''' and battery pack 102 of the instant application. In this embodiment, instead of a counter 140 the battery charger 100'''' includes a timer 152'''' in addition to the components described above with respect to FIG. 9. Similar to the counter 140'' of FIG. 9, the timer 152'''' includes an input coupled to an output of the cell voltage monitor 116'. The timer 152'''' input receives the $V_{CVM}$ signal from the cell voltage monitor output. The timer 152'' also includes an output coupled to an input of the charge controller 118''''. The timer 152'''' provides a control signal to the charge controller 118''''.

Similar to the counter 140'' of FIG. 9, when the cell voltage monitor 116'''' receives information from the battery pack 102 that the voltage level of one or more of the plurality of battery cells 110 and/or the voltage level of the battery pack 102 has exceeded the corresponding high voltage level threshold the cell voltage monitor 116'''' will output a low $V_{CVM}$ signal. When the $V_{CVM}$ transitions to the low signal the timer 152'''' will start a timer and will output a control signal to the charge controller 118'''' to not provide charging power/current to the battery pack 102. As illustrated in FIG. 11, when the output $V_{CVM}$ is low the charge controller output $I_{Charge}$ will be zero.

As noted above, after the initial charging current is no longer provided to the battery pack 102 and battery cells 110, the battery cells 110 will relax—their voltage level will drop— to a point where the voltage level of the cell(s) 110 that were above the high voltage level threshold will drop below the high voltage level threshold. As a result, the cell voltage monitor 116'''' will once again output a high $V_{CVM}$ signal. When this occurs the timer 152'''' will stop timing and depending upon the timed period of the timer 152'''' (as discussed below), reset the timer 152'''' and output a control signal to the charge controller 118'''' to again provide charging power/current to the battery pack 102. Again, after a period of charging time the voltage level of one or more of the plurality of battery cells 110 will exceed the high voltage level threshold. Again, the cell voltage monitor 116'''' will receive information indicating this status. And again, the cell voltage monitor 116'''' will output a low $V_{CVM}$ signal and the timer 152'''' will start timing and will output a control signal to the charge controller 118'''' to not provide charging power/current to the battery pack 102. The timer 152'''' will be configured to include a predefined time period maximum T. When timer 152'''' time period reaches the time period maximum T the timer 152'''' will end the charging process. An exemplary time period is 1 second.

Referring to FIGS. 10 and 11, as indicated by the output $V_{CVM}$ of the cell voltage monitor 116'''', the relaxation time (the time it takes for the cell(s) that have reached or exceeded the high voltage level threshold to fall below the threshold after they have reached or exceeded the threshold) increases each time a cell(s) 110 reaches or exceeds the threshold. More particularly, referring to FIGS. 10 and 11, the time period of the first low output from the cell voltage monitor 116'''' is shorter than the time period of the second low output from the cell voltage monitor 116''''. And the time period of the second low output from the cell voltage monitor 116'''' is shorter than the time period of the third low output from the cell voltage monitor 116''''. And the time period of the third low output from the cell voltage monitor 116'''' is shorter than the time period of the fourth low output from the cell voltage monitor 116''''. With this in mind, the timer 152'''' is configured such that when the time period of the low output from the cell voltage monitor 116'''' (the relaxation period) reaches a predefined time period T the timer 152'''' sends a final stop charging signal to the charge controller 118'''' and ends the charging process.

Figure 18:
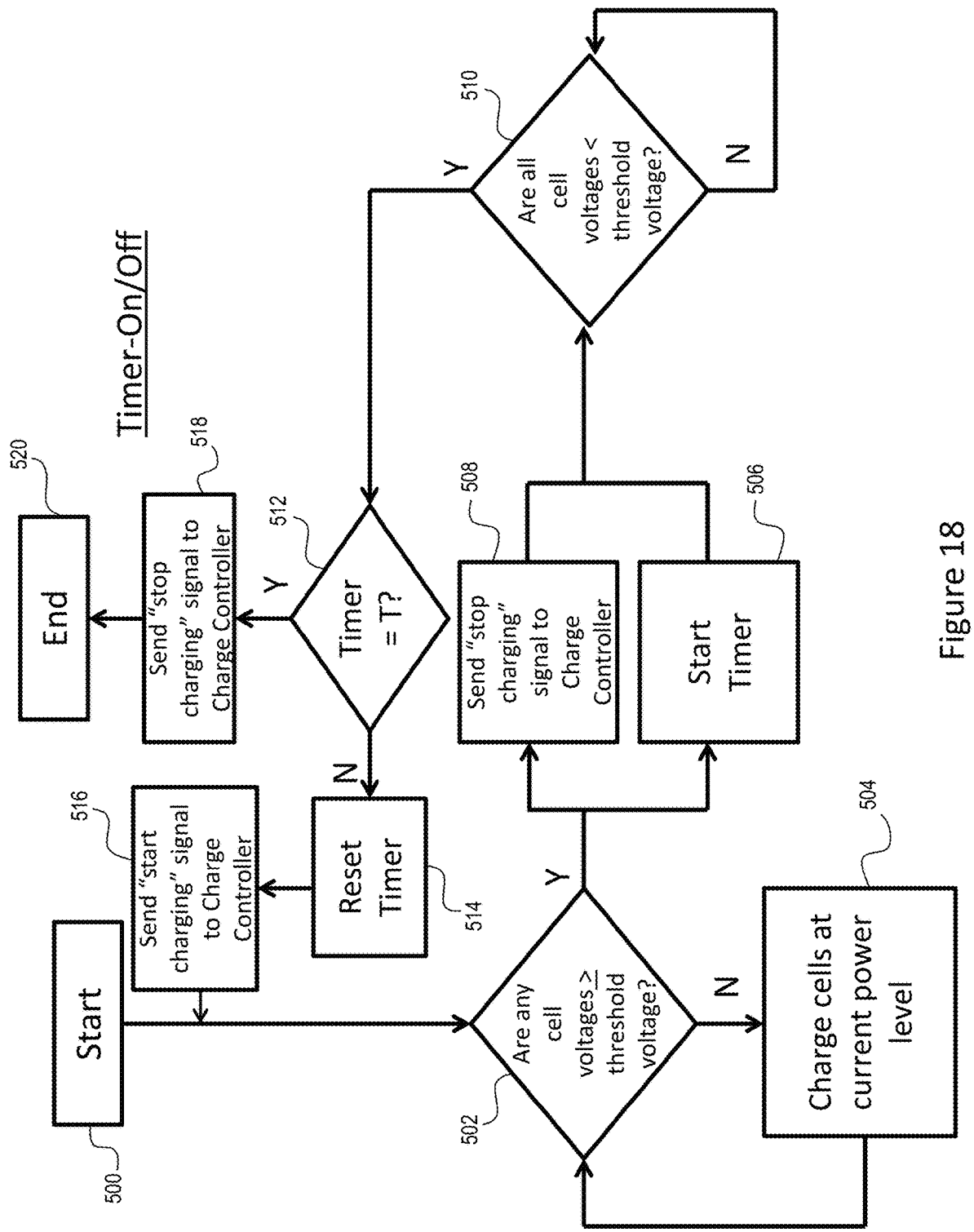
FIG. 18 is a flow chart of an exemplary embodiment of a method of operating the exemplary battery charger of FIG. 17.

FIG. 18 illustrates a flow chart of an exemplary charging process carried out by the battery charger 100'''' of FIG. 17. Specifically, when the battery pack 102 is coupled to the battery charger 100'''' the charging process will begin (step 500). In the next step, the cell voltage monitor 116'''' determines if the voltage level of any of the plurality of battery cells 110 of the battery pack 102 is greater than or equal to the high voltage level threshold (step 502). If the voltage level of none of the plurality of cells 110 are greater than or equal to the high voltage level threshold then the battery charger 100'''' charges the battery pack 102 at the set power level (step 504). However, if the cell voltage monitor 116'''' determines that the voltage level of any of the plurality of battery cells 110 of the battery pack 102 is greater than or equal to the high voltage level threshold then the timer 152'' starts the timer period (step 506) and simultaneously the timer 152'''' sends a "stop charging" signal to the charge controller 118'''' (step 508). The process then waits for the battery cells to relax (step 510). In other words, the cell voltage monitor 116'''' continues to monitor the voltage level of the battery cells 110 to determine if/when the voltage level of all of the cells 110 falls below the high voltage level threshold. When the voltage level of all of the battery cells 110 has fallen below the high voltage level threshold the timer 152'''' then determines if the timer period has reached the predefined time T (step 512). If the timer period has not reached the predefined timer period T the timer 152'''' is reset (step 514) and sends a "start charging" signal to the charge controller 118'''' (step 516). Thereafter, the process will return to the step 502 in which the cell voltage monitor 116'''' continues to monitor the voltage level of the battery cells 110 to determine if the voltage level of any of the battery cells 110 is greater than or equal to the high voltage level threshold. If the timer period has reached the predefined time period T then the timer 152'''' sends a final "stop charging" signal to the charge controller 118'''' (step 518) and the charging process will be stopped (step 520).

Figure 19:
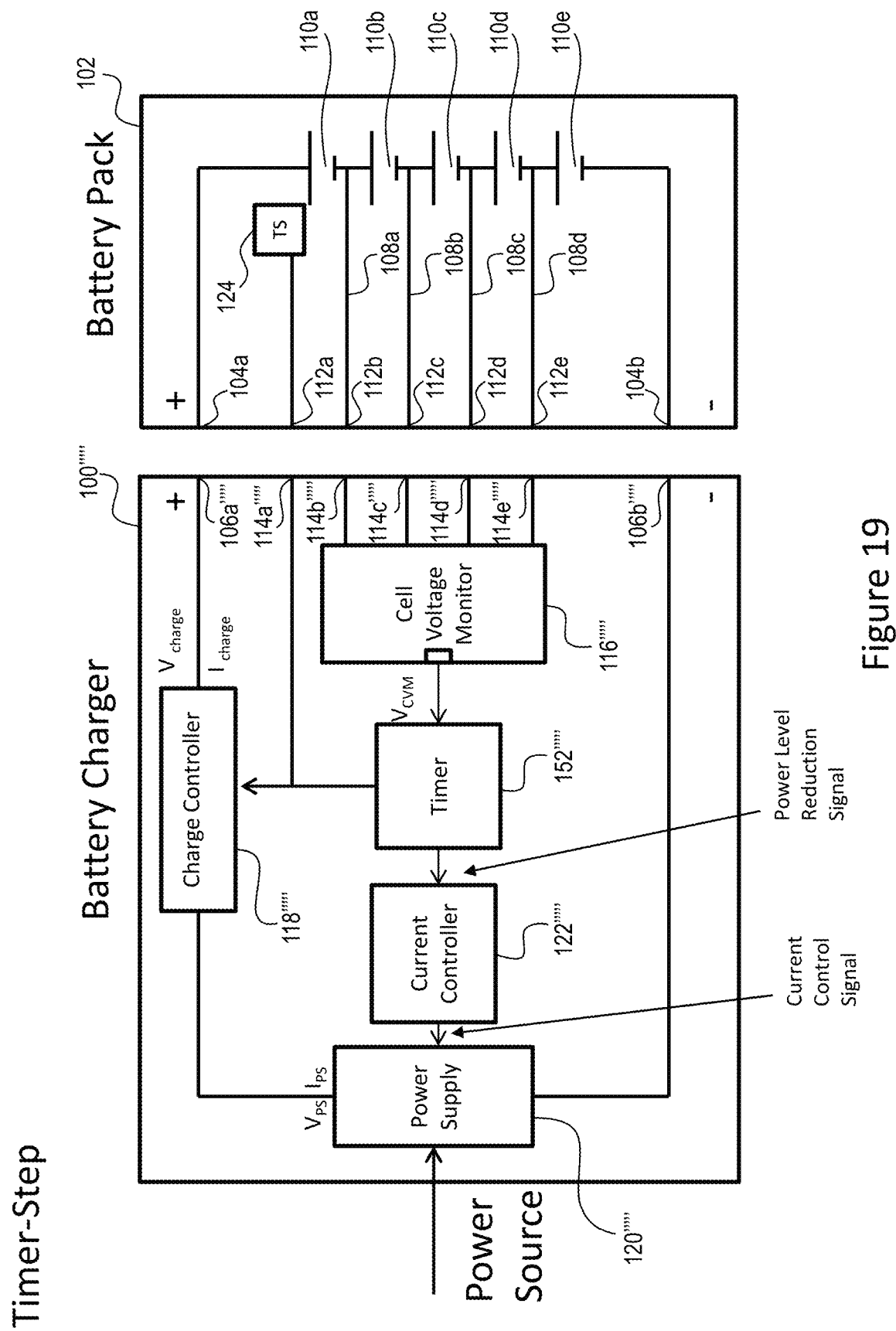
FIG. 19 is a block diagram of a fifth exemplary embodiment of a battery charger of the present invention.
Figure 20:
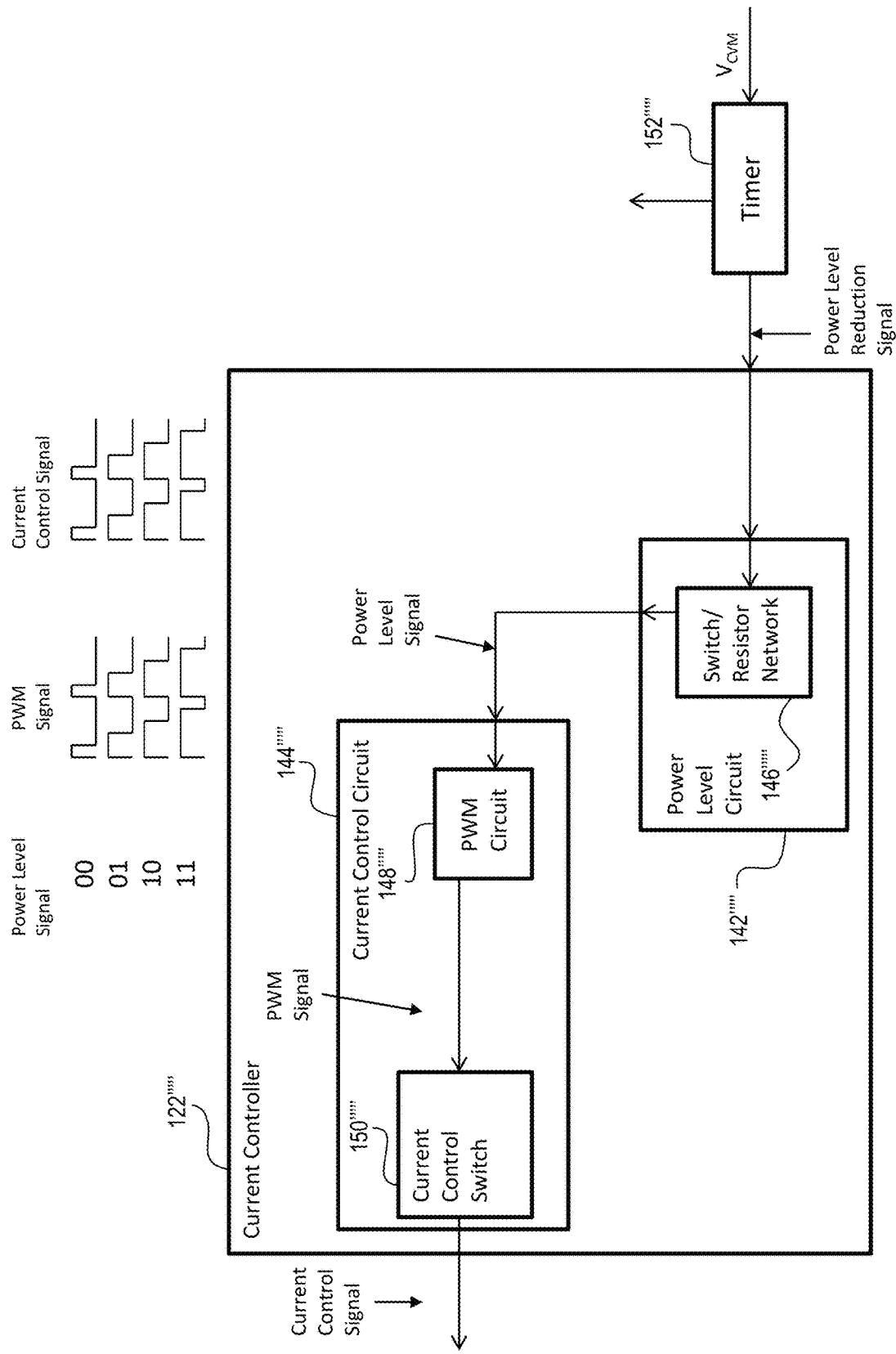
FIG. 20 is a block diagram of an exemplary embodiment of a current controller of the exemplary battery charger of FIG. 19.

FIG. 19 illustrates an alternate exemplary embodiment of a battery charger 100 and battery pack 102 of the instant application. This exemplary embodiment is similar to the embodiment illustrated in FIG. 13. However, instead of a counter 140''' this embodiment includes a timer 152'''' similar to the timer 152'''' illustrated in FIG. 17. With regard to controlling the overall charging process, the timer 152'''' of FIG. 19 operates in the same manner as the timer 152'''' of FIG. 17. In other words, when the timed period of the timer 152'''' of FIG. 19 reaches a predefined time period T the timer 152'''' sends a final "stop charging" signal to the charge controller 118'''' to end the charging process. However, when controlling the charging level (power/current) of the power supply 120'''', the timer 152'''' operates in the same manner as the counter 140''' of FIG. 13. In other words, when the timer 152'''' receives a low $V_{CVM}$ signal it outputs a power level reduction signal to the current controller 122''''. The current reduction process described above with respect to FIGS. 13, 14 and 15 is also implemented by the current controller 122'''' of the battery charger 100'''' of FIGS. 19 and 20.

Figure 21:
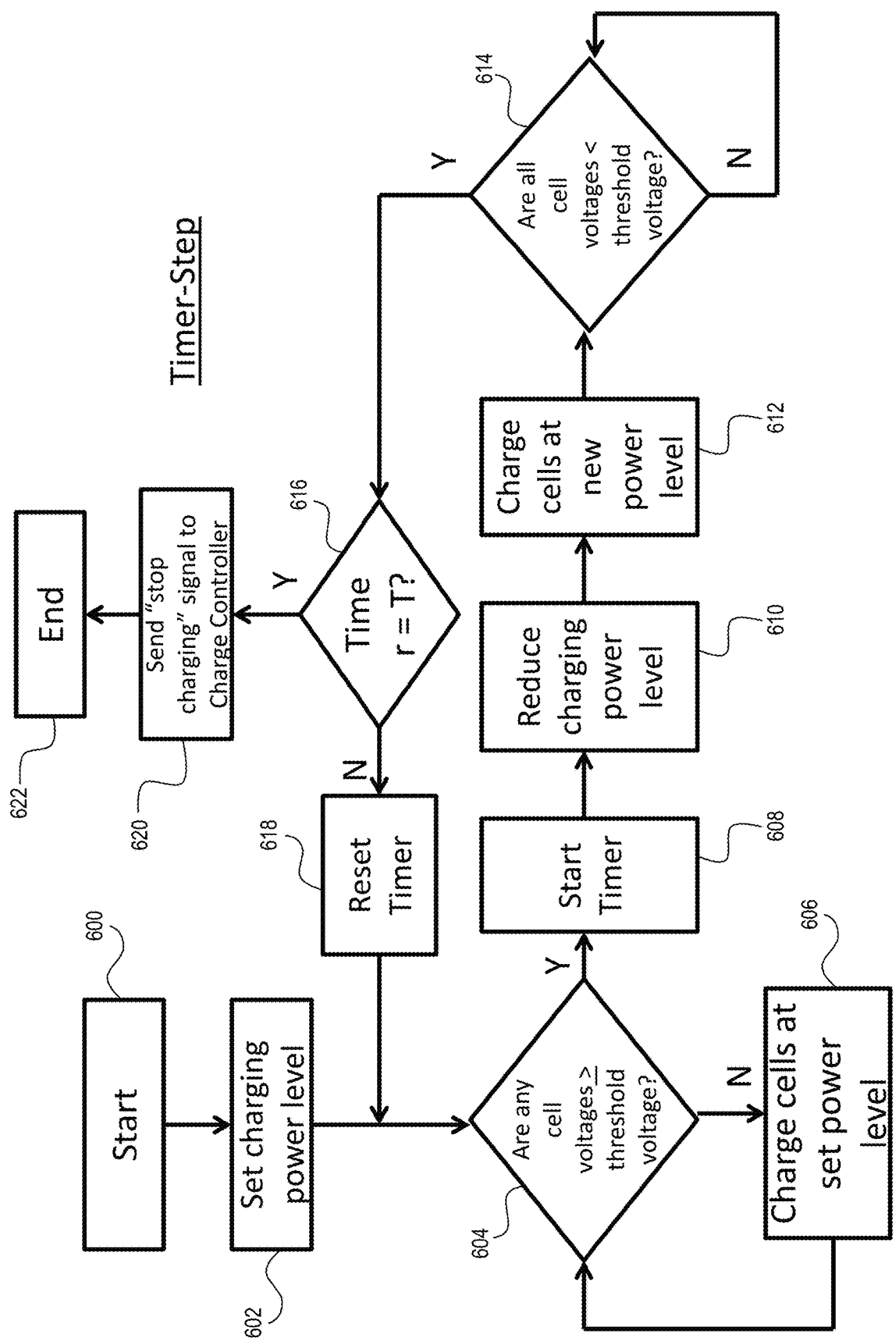
FIG. 21 is a graph illustrating an exemplary relationship between the battery and the charging current of the exemplary battery charger of FIG. 19.

FIG. 21 illustrates a flow chart of an exemplary charging process carried out by the battery charger 100'''' of FIG. 19. Specifically, when the battery pack 102 is coupled to the battery charger 100'''' the charging process will begin (step 600). The battery charger 100'''' sets the charging power level to a predetermined level (step 602), e.g. 6 Amps. In the next step, the cell voltage monitor 116'''' determines if the voltage level of any of the plurality of battery cells 110 of the battery pack 102 is greater than or equal to the high voltage level threshold (step 604). If the voltage level of none of the plurality of cells 110 are greater than or equal to the high voltage level threshold then the battery charger 100'''' charges the battery pack 102 at the set power level (step 606). However, if the cell voltage monitor 116'''' determines that the voltage level of any of the plurality of battery cells 110 of the battery pack 102 is greater than or equal to the high voltage level threshold then the timer 152'''' starts the timer period (step 608) and reduces the charging power supplied by the power supply 120'''' (step 610), e.g., 4 Amps and charges the battery cells 110 at the new power level (step 612).

The process then waits for the battery cells 110 to relax (step 614). In other words, the cell voltage monitor 116'''' continues to monitor the voltage level of the battery cells 110 to determine if/when the voltage level of all of the cells 110 falls below the high voltage level threshold. When the voltage level of all of the battery cells 110 has fallen below the high voltage level threshold the timer 152'''' then determines if the timer period has reached the predefined time period T (step 616). If the timer period has not reached the predefined timer period T the timer 152'''' is reset (step 618). Thereafter, the process will return to the step 604 in which the cell voltage monitor 116'''' continues to monitor the voltage level of the battery cells 110 to determine if the voltage level of any of the battery cells 110 is greater than or equal to the high voltage level threshold. If the timer period has reached the predefined time period T then the timer 152'''' sends a final "stop charging" single to the charge controller (step 620) and the charging process will be stopped (step 622).

The counter and the timer and the other battery charger components may implemented as analog components, digital components or a combination of analog and digital components.

Numerous modifications may be made to the exemplary implementations described above. These and other implementations are within the scope of this application.

A first embodiment of a battery charger of the instant application comprises a plurality of components. The plurality of components include a power supply for supplying power for charging a battery, a temperature sensor configured to sense a temperature of one of the plurality of components and output a temperature signal representative of the temperature of the one component, and a current controller configured to receive the temperature signal and control an amount of power supplied by the power supply based solely on the temperature signal.

In the aforementioned first embodiment, the temperature sensor may be configured to sense the temperature of the power supply.

In the aforementioned first embodiment, the power supply may comprise a transformer and the temperature sensor may be configured to sense the temperature of the transformer.

In the aforementioned first embodiment, the current controller may comprise at least one switch.

In the aforementioned first embodiment, the power supply may be configured to operate in a first mode and a second mode, wherein the first mode supplies a first level of power and the second mode supplies a second level of power, the second level of power being less than the first level of power and wherein the power supply operates in the first mode when the temperature of the component is less than a threshold temperature and operates in the second mode when the temperature of the component is greater than or equal to the threshold temperature.

A second embodiment of a battery charger of the instant application provides a method of charging a battery. The method comprises providing a battery charger comprising a plurality of components, wherein the plurality of components comprises a power supply for supplying power to charger the battery, a control circuit configured to control the power supply, and a temperature sensor configured to sense a temperature of one of the plurality of components; producing a temperature signal by the temperature sensor representative of the temperature of the one component; providing the temperature signal to the control circuit; and controlling the power supplied to the battery by the power supply based solely on the temperature signal.

The aforementioned second embodiment may further comprise configuring the power supply to operate in a first mode or a second mode, wherein the first mode supplies a first level of power and the second mode supplies a second level of power, the second level of power being less than the first level of power; monitoring the temperature of the one component and if the temperature of the one component is less than a temperature threshold than operating the power supply in the first mode and if the temperature of the one component is greater than or equal to the temperature threshold than operating the power supply in the second mode.

The aforementioned second embodiment may further comprise checking the temperature of the one component upon receiving the battery in the charger.

The aforementioned second embodiment may further comprise continuously monitoring the temperature of the one component and if the temperature of the one component crosses the temperature threshold than operating the power supply in other of the first mode or second mode.

A third embodiment of a battery charger of the instant application provides a method of charging a battery. The method comprises providing a battery charger comprising a power supply, wherein the power supply is configured to provide charging power to the battery; providing a charge control circuit, wherein the charge control circuit is configured to adjust the charging power provided to the battery; providing a cell voltage monitoring circuit, wherein the cell voltage monitoring circuit is configured to output a signal representative of a voltage of the battery; providing a monitoring circuit, wherein the monitoring circuit is configured to monitor a characteristic of the cell voltage monitoring circuit output signal; and controlling the charging power provided to the battery based on the characteristic of the cell voltage monitoring circuit output signal.

In the aforementioned third embodiment, the characteristic is a number of times the cell voltage monitoring circuit output signal changes from a first state to a second state.

In the aforementioned third embodiment, if the number of times the cell voltage monitoring circuit output signal has changed from the first state to the second state is less than a predefined threshold then continuing to provide power to the battery and if the number of times the cell voltage monitoring circuit output signal has changed from the first state to the second state is equal to the threshold then ending the charging process.

In the aforementioned third embodiment, the power provided to the battery is reduced when the output signal changes from the first state to the second state.

In the aforementioned third embodiment, the power is not provided to the battery when the output signal changes from the first state to the second state.

In the aforementioned third embodiment, the cell voltage monitoring circuit output signal changes from a first state to a second state and the characteristic is a duration of time the cell voltage monitoring circuit output signal remains in the second state.

In the aforementioned third embodiment, if the duration of time the cell voltage monitoring circuit output signal remains in the second state is less than a predefined threshold then continuing to provide power to the battery and if the duration of time the cell voltage monitoring circuit output signal remains in the second state is equal to the threshold then ending the charging process.

In the aforementioned third embodiment, the power provided to the battery is reduced when the output signal changes from the first state to the second state.

In the aforementioned third embodiment, the power is not provided to the battery when the output signal changes from the first state to the second state.

The invention claimed is:

1. A battery charger comprising:
    a plurality of components, wherein the plurality of components includes a power supply for supplying power for charging a battery;
    a temperature sensor configured to sense a temperature of the power supply and output a temperature signal representative of the temperature of the power supply; and
    a current controller configured to receive the temperature signal and control the power supply to adjust an amount of power output by the power supply based solely on the temperature signal so as to maintain the temperature of the power supply at approximately a constant temperature level over a time period by varying the amount of power output by the power supply over the same time period.

2. The battery charger, as recited in claim 1, wherein the power supply may comprise a transformer and the temperature sensor senses the temperature of the transformer.

3. The battery charger, as recited in claim 1, wherein the current controller comprises at least one switch.

4. The battery charger, as recited in claim 1, wherein the power supply is configured to operate in a first mode and a second mode, wherein when operating in the first mode the power supply outputs a first level of power and when operating in the second mode the power supply outputs a second level of power, the second level of power being less than the first level of power and wherein the power supply operates in the first mode when the temperature of the one component is less than a threshold temperature and operates in the second mode when the temperature of the one component is greater than or equal to the threshold temperature.

5. A method of charging a battery, comprising the steps of:
    providing a battery charger comprising a plurality of components, wherein the plurality of components comprises a power supply for supplying power to charger the battery, a control circuit configured to control the power supply, and a temperature sensor configured to sense a temperature of one of the plurality of components;
    producing a temperature signal by the temperature sensor representative of the temperature of the one component;
    providing the temperature signal to the control circuit; and
    controlling the power supply to adjust an amount of power generated by the power supply and provided to the battery based solely on the temperature signal so as to maintain the temperature of the power supply at approximately a constant temperature level over a time period by varying the amount of power output by the power supply over the same time period.

6. The method of charging a battery, as recited in claim 5, further comprising the steps of configuring the power supply to operate in a first mode or a second mode, wherein when operating in the first mode the power supply outputs a first level of power and when operating in the second mode the power supply outputs a second level of power, the second level of power being less than the first level of power; monitoring the temperature of the one component and, if the temperature of the one component is less than a temperature threshold, then operating the power supply in the first mode, and if the temperature of the one component is greater than or equal to the temperature threshold, then operating the power supply in the second mode.

7. The method of charging a battery, as recited in claim 6, further comprising the step of checking the temperature of the one component upon receiving the battery in the charger.

8. The method of charging a battery, as recited in claim 7, further comprising the step of continuously monitoring the temperature of the one component and if the temperature of the one component crosses the temperature threshold then operating the power supply in the other of the first mode or second mode.

\* \* \* \* \*